United States Patent
Park et al.

(10) Patent No.: US 11,366,490 B2
(45) Date of Patent: *Jun. 21, 2022

(54) USER TERMINAL DEVICE AND DISPLAYING METHOD THEREOF

(71) Applicant: SAMSUNG ELECTRONICS CO., LTD., Suwon-si (KR)

(72) Inventors: Hae-yoon Park, Seoul (KR); Ji-yeon Kwak, Seoul (KR); Hyun-jin Kim, Seoul (KR); Yun-kyung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,283

(22) Filed: Mar. 26, 2021

(65) Prior Publication Data

US 2021/0216101 A1 Jul. 15, 2021

Related U.S. Application Data

(63) Continuation of application No. 16/670,556, filed on Oct. 31, 2019, now Pat. No. 10,976,773, which is a
(Continued)

(30) Foreign Application Priority Data

Jul. 15, 2014 (KR) .................. 10-2014-0089251

(51) Int. Cl.
*G06F 3/041* (2006.01)
*G06F 1/16* (2006.01)
(Continued)

(52) U.S. Cl.
CPC .......... *G06F 1/1616* (2013.01); *G06F 1/1641* (2013.01); *G06F 1/1643* (2013.01);
(Continued)

(58) Field of Classification Search
CPC .... G06F 1/1616; G06F 1/1641; G06F 1/1643; G06F 1/1677; G06F 2203/04803; G06F 3/0487; G06F 3/0488; G06F 3/04886
See application file for complete search history.

(56) References Cited

U.S. PATENT DOCUMENTS 6,466,369 B1 10/2002 Maddock
8,860,632 B2 10/2014 Kilpatrick, II et al.
(Continued)

FOREIGN PATENT DOCUMENTS

| CN | 101674361 A | 3/2010 |
| CN | 102150094 A | 8/2011 |

(Continued)

OTHER PUBLICATIONS

Communication dated Jul. 7, 2021 by the European Patent Office in European Patent Application No. 15746551.9.
(Continued)

*Primary Examiner* — Insa Sadio
(74) *Attorney, Agent, or Firm* — Sughrue Mion, PLLC

(57) ABSTRACT

A user terminal device and a displaying method thereof are provided. The user terminal device includes a display configured to be divided into a first display area, a second display area, and a third display area along a first folding line corresponding to the first hinge and a second folding line corresponding to the second hinge and a controller configured to, in response to the first bending interaction of unfolding the display with reference to the first folding line being detected, control the display to display an execution screen of the application including a first function and a second function, related to the first function, in the first display area and the second display area, and in response to a second bending interaction of unfolding the display with reference to the second folding line being detected, control the display to display an execution screen of the application
(Continued)

including the first function, the second function, and a third function, related to the second function, in the first display area, the second display area, and the third display area.

6 Claims, 46 Drawing Sheets

Related U.S. Application Data continuation of application No. 15/893,366, filed on Feb. 9, 2018, now Pat. No. 10,528,078, which is a continuation of application No. 14/618,517, filed on Feb. 10, 2015, now Pat. No. 9,891,663.

(60) Provisional application No. 61/937,778, filed on Feb. 10, 2014.

(51) Int. Cl.
*G06F 3/0487* (2013.01)
*G06F 3/0488* (2022.01)

(52) U.S. Cl.
CPC .......... *G06F 1/1677* (2013.01); *G06F 3/0487* (2013.01); *G06F 3/0488* (2013.01); *G06F 2203/04803* (2013.01)

(56) References Cited

U.S. PATENT DOCUMENTS

| | | | |
|---|---|---|---|
| 8,866,840 | B2 | 10/2014 | Dahl et al. |
| 9,009,984 | B2 | 4/2015 | Caskey et al. |
| 9,052,769 | B2 | 6/2015 | Choi et al. |
| 9,152,225 | B2 | 10/2015 | Park et al. |
| 9,173,306 | B2 | 10/2015 | Lim et al. |
| 9,489,078 | B2 | 11/2016 | Seo et al. |
| 9,489,079 | B2 | 11/2016 | Seo et al. |
| 9,489,080 | B2 | 11/2016 | Seo et al. |
| 2004/0008191 | A1 | 1/2004 | Poupyrev et al. |
| 2007/0205997 | A1 | 9/2007 | Lieshout et al. |
| 2009/0224999 | A1 | 9/2009 | Kuwahara et al. |
| 2010/0060548 | A1 | 3/2010 | Choi et al. |
| 2010/0064536 | A1 | 3/2010 | Caskey et al. |
| 2010/0085274 | A1 | 4/2010 | Kilpatrick, II et al. |
| 2011/0057873 | A1 | 3/2011 | Geissler et al. |
| 2011/0216064 | A1 | 9/2011 | Dahl et al. |
| 2011/0241998 | A1 | 10/2011 | McKinney et al. |
| 2012/0094718 | A1* | 4/2012 | Kim .................. H04M 1/72484 455/559 |
| 2012/0262367 | A1 | 10/2012 | Chiu et al. |
| 2012/0264489 | A1 | 10/2012 | Choi et al. |
| 2012/0280924 | A1 | 11/2012 | Kummer et al. |
| 2013/0073473 | A1 | 3/2013 | Heath |
| 2013/0162663 | A1 | 6/2013 | Mano et al. |
| 2013/0215011 | A1 | 8/2013 | Ke |
| 2013/0217443 | A1 | 8/2013 | Lim et al. |
| 2013/0321264 | A1 | 12/2013 | Park et al. |
| 2013/0321340 | A1 | 12/2013 | Seo et al. |
| 2014/0015745 | A1 | 1/2014 | Chae et al. |
| 2014/0028596 | A1 | 1/2014 | Seo et al. |
| 2014/0035869 | A1 | 2/2014 | Yun et al. |
| 2014/0313143 | A1* | 10/2014 | Jung .................. G06F 3/04817 345/173 |
| 2015/0138103 | A1 | 5/2015 | Nishi |
| 2015/0227224 | A1 | 8/2015 | Park et al. |
| 2015/0309691 | A1 | 10/2015 | Seo et al. |
| 2015/0378503 | A1 | 12/2015 | Seo et al. |
| 2017/0052698 | A1 | 2/2017 | Seo et al. |

FOREIGN PATENT DOCUMENTS

| | | |
|---|---|---|
| CN | 102187296 A | 9/2011 |
| CN | 102736691 A | 10/2012 |
| CN | 103259886 A | 8/2013 |
| CN | 103455138 A | 12/2013 |
| CN | 103477304 A | 12/2013 |
| ER | 2 669 771 A1 | 12/2013 |
| KR | 10-2010-0019164 A | 2/2010 |
| KR | 10-2012-0102293 A | 9/2012 |
| KR | 10-2013-0096048 A | 8/2013 |
| KR | 1020130099664 A | 9/2013 |
| KR | 10-1320252 B1 | 10/2013 |
| WO | 2010028399 A1 | 3/2010 |

OTHER PUBLICATIONS

Communication dated Sep. 4, 2018, issued by the U.S. Patent Office in counterpart U.S. Appl. No. 14/618,476.
Communication dated Jan. 25, 2019, issued by the Korean Intellectual Property Office in counterpart Korean Patent Application No. 10-2014-0089251.
Office Action dated Jun. 3, 2016 issued by United States Patent and Trademark Office in U.S. Appl. No. 14/618,476.
Search Report dated Apr. 29, 2015, issued by the International Searching Authority in counterpart International Application No. PCT/KR2015/001348.
Communication dated May 17, 2019, issued by the State Intellectual Property Office of P R. China in counterpart Chinese Application No. 201580007834.8.
Communication dated Jul. 14, 2017, issued by the European Patent Office in counterpart European Patent Application No. 15746478.5.
Search Report dated May 11, 2015 issued by the International Searching Authority in counterpart International Patent Application No. PCT/KR2015/001336 (PCT/ISA/210).
Communication dated Jun. 18, 2019, issued by the Korean Patent Office in counterpart Korean Application No. 10-2014-0088814.
Communication dated Aug. 24, 2018, issued by the State Intellectual Property Office of P.R. China in counterpart Chinese Application No. 201580007994.2.
Communication dated Jul. 14, 2017, issued by the European Patent Office in counterpart European Patent Application No. 15746551.9.
Written Opinion dated Apr. 29, 2015, issued by the International Searching Authority in counterpart International Application No. PCT/KR2015/001348.
Office Action dated May 2, 2018, issued by the United States Patent and Trademark Office in U.S. Appl. No. 14/618,476.
Communication dated Sep. 18, 2018, issued by the Korean Intellectual Property Office in counterpart Korean Patent Application No. 10-2014-0088814.
Communication dated Nov. 16, 2018, issued by the European Patent Office in counterpart European Patent Application No. 15746551.9.
Office Action dated Dec. 29, 2016 issued by United States Patent and Trademark Office in U.S. Appl. No. 14/618,476.
Office Action dated Sep. 27, 2017, issued by the United States Patent and Trademark Office in counterpart U.S. Appl. No. 14/618,476.
Written Opinion dated May 11, 2015 issued by the International Searching Authority in counterpart International Patent Application No. PCT/KR2015/001336 (PCT/ISA/237).
Communication dated Jul. 12, 2018, issued by the State Intellectual Property Office of the People's Republic of China in counterpart Chinese Patent Application No. 201580007834.8.
Communication dated Apr. 25, 2019, issued by the Korean Patent Office in counterpart Korean Application No. 10-2014-0088814.
Communication dated Feb. 7, 2019, issued by the European Patent Office in counterpart European Patent Application No. 15746478.5.
Office Action dated Aug. 8, 2019 issued by the United States Patent and Trademark Office in U.S. Appl. No. 16/513,083.
Communication dated Nov. 6, 2019 issued by the State Intellectual Property Office of P R. China in counterpart Chinese Application No. 201580007834.8.
Communication dated Dec. 16, 2019 issued by the Korean Intellectual Property Office in counterpart Korean Application No. 10-2019-0114139.
Communication dated Mar. 18, 2020 issued by the Indian Patent Office in Indian Application No. 201617029936.

(56) References Cited

OTHER PUBLICATIONS

Communication dated Mar. 24, 2020 issued by the State Intellectual Property Office of the P.R.China in Chinese Application No. 201580007834.8.
Communication dated Apr. 20, 2020 issued by the Indian Patent Office in Indian Application No. 201617029933.
Communication dated Jul. 21, 2020 issued by the European Patent Office in European Patent Application No. 15746478.5.
Office Action dated Sep. 3, 2020 issued by the United States Patent and Trademark Office in U.S. Appl. No. 16/881,782.
Communication dated Nov. 23, 2020 issued by the European Patent Office in European Application No. 15 746 551.9.
Communication dated Feb. 17, 2022 issued by the European Patent Office in European Application No. 21203886.3.
Communication dated Apr. 26, 2022 issued by the National Intellectual Property Administration of P R. China in Chinese Application No. 201580007834.8.

* cited by examiner

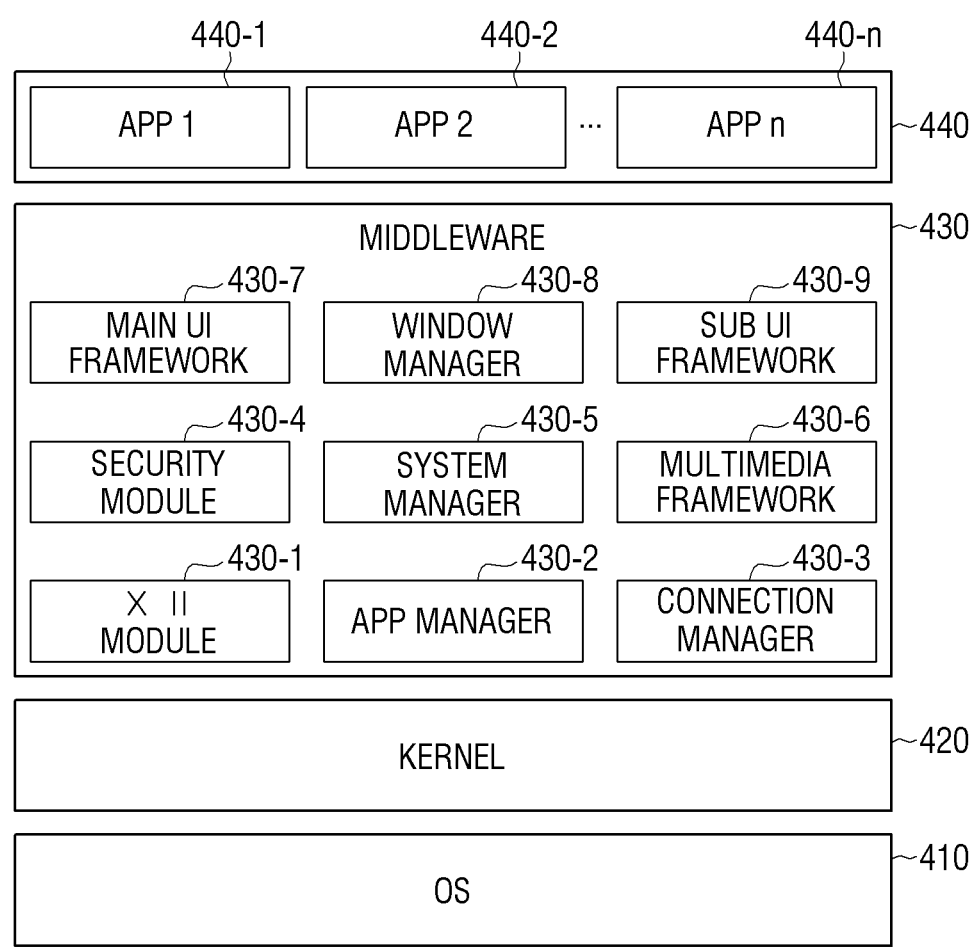

PHONE MODE

TABLET MODE

FIG. 6A
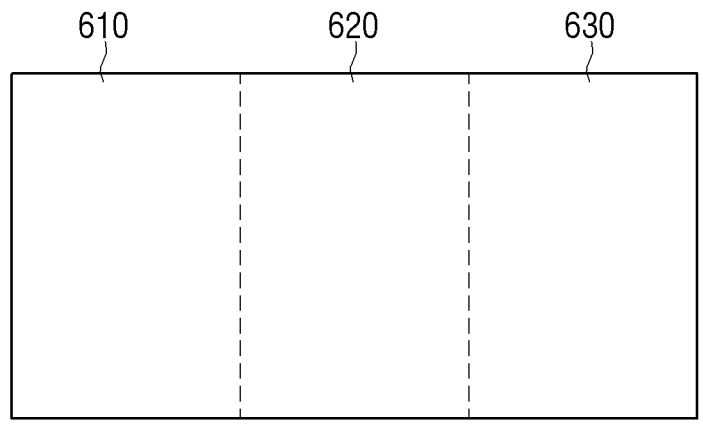
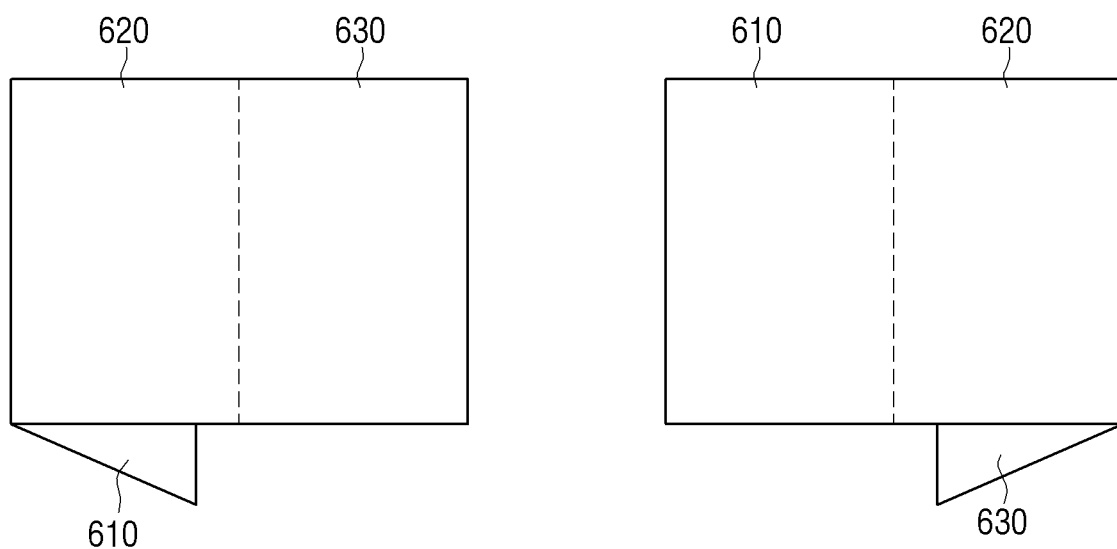

FIG. 6B
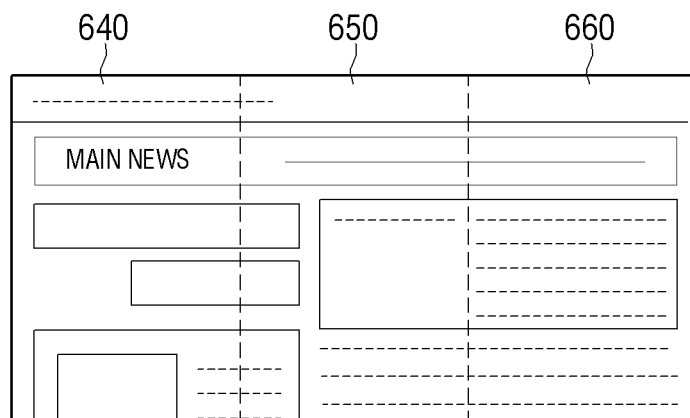
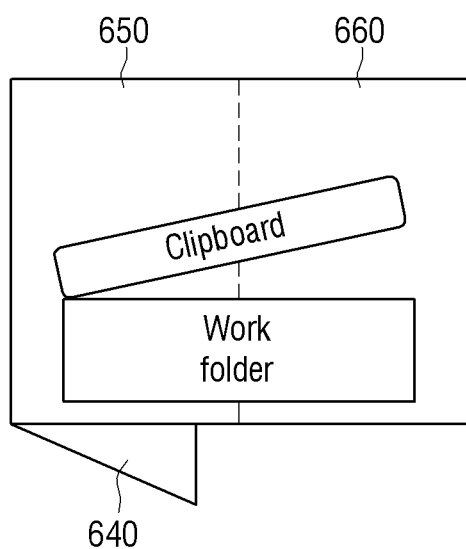
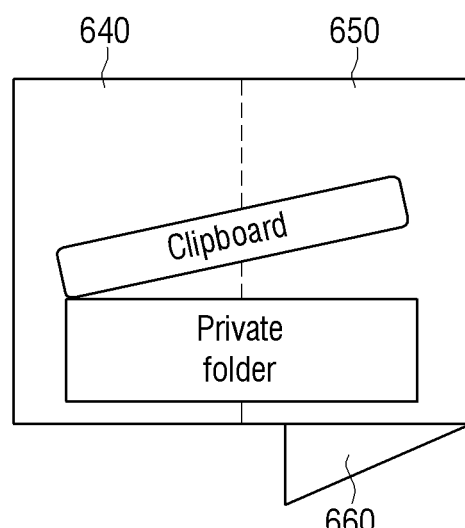

FIG. 7A
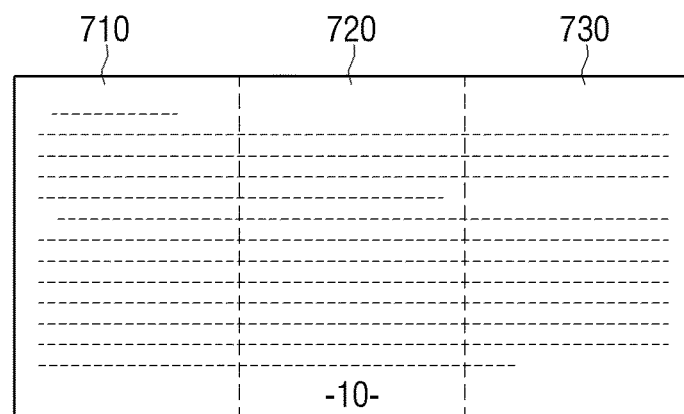
Bend ↓
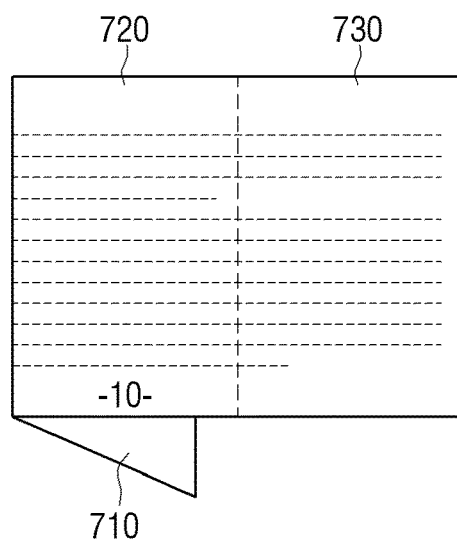
Unfold ↓
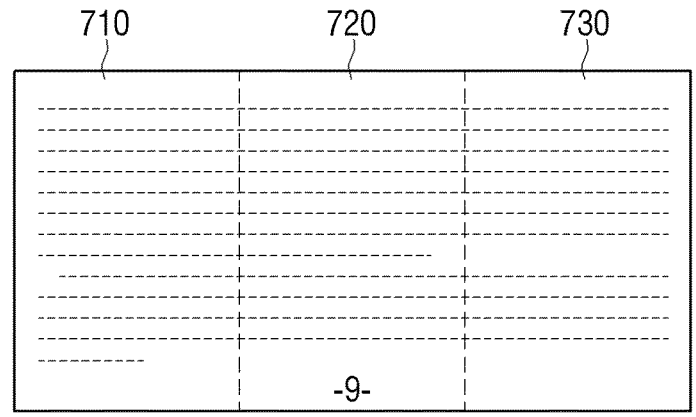

FIG. 8A
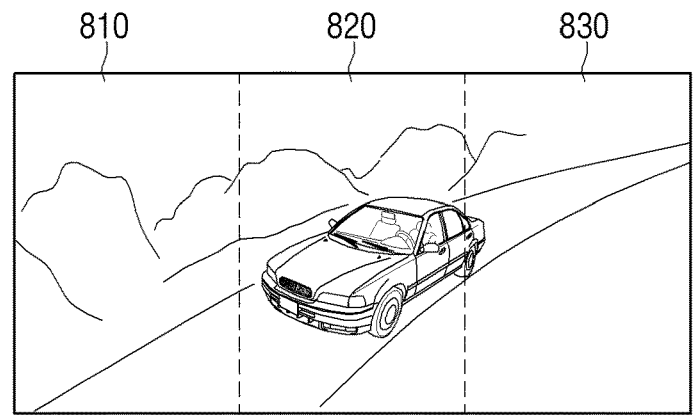
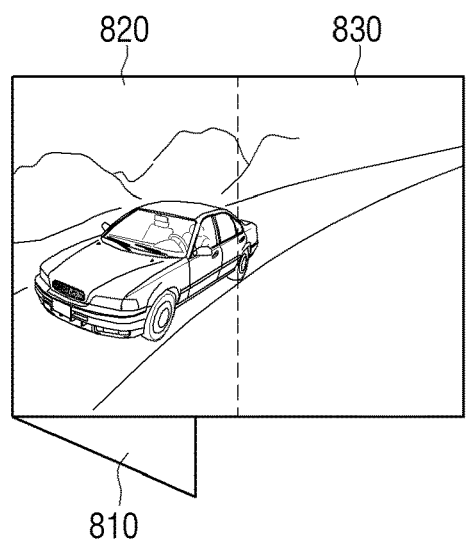
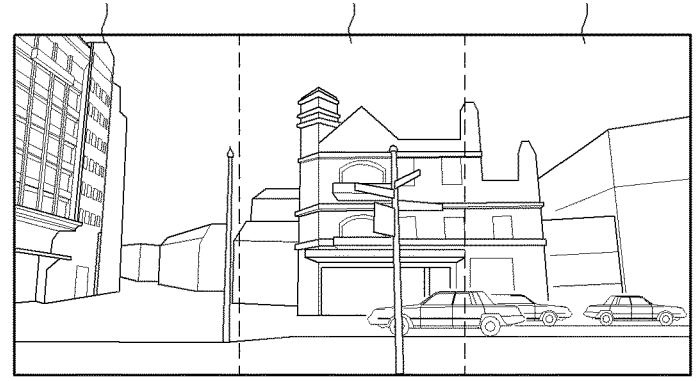

FIG. 9A
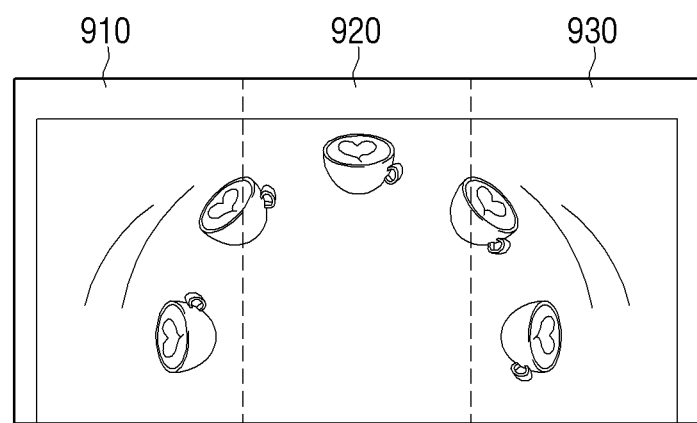
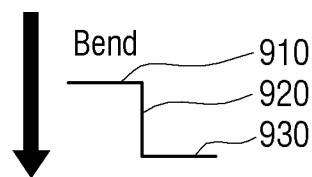
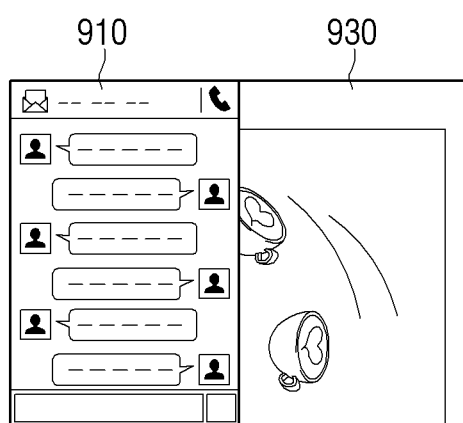

FIG. 9B
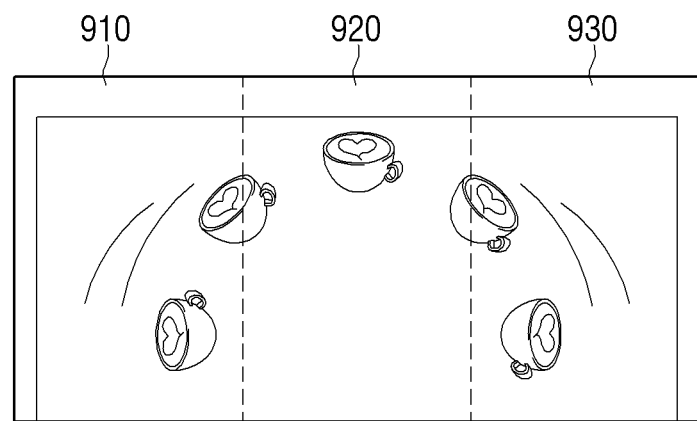
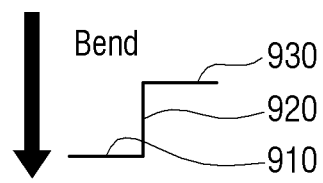
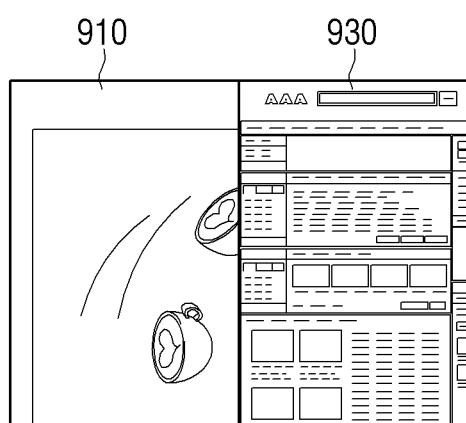

FIG. 10A
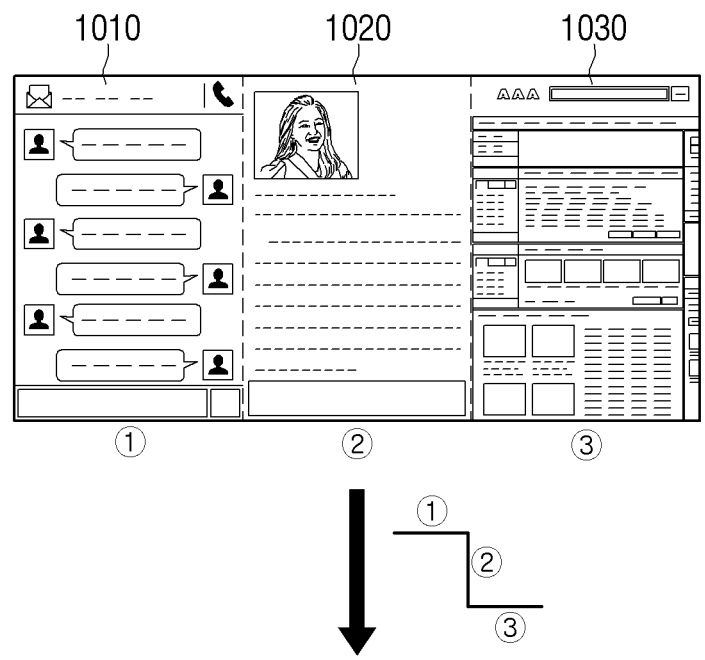
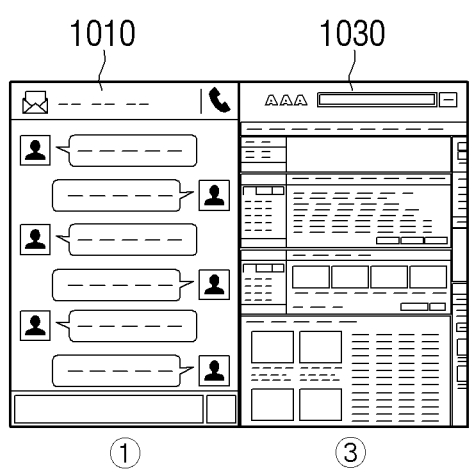

FIG. 10C
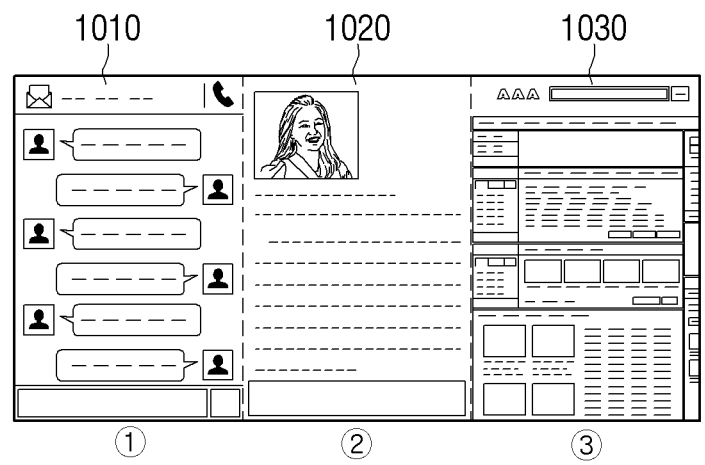
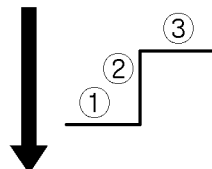
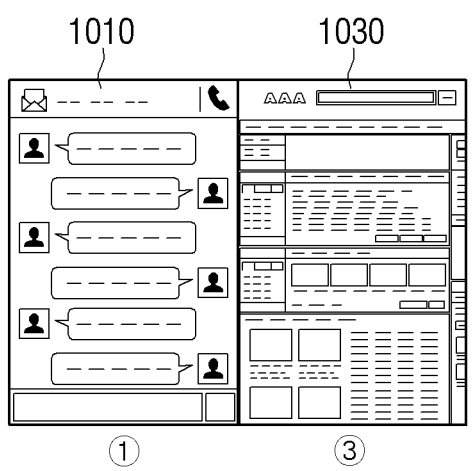

FIG. 14A
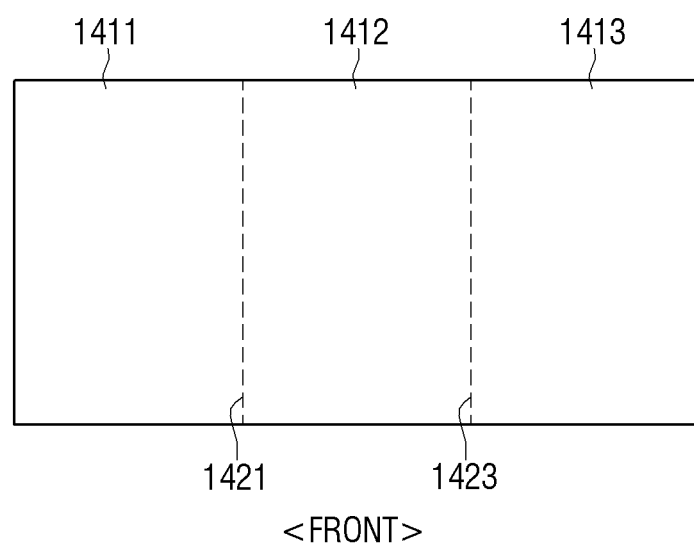
<FRONT>
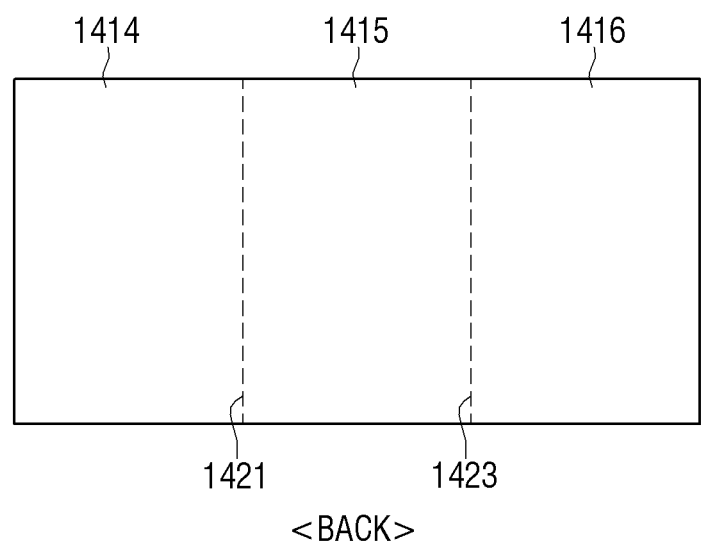
<BACK>

FIG. 14C
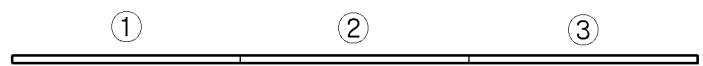

USER TERMINAL DEVICE AND DISPLAYING METHOD THEREOF

CROSS-REFERENCE TO RELATED APPLICATIONS

This application is a Continuation of U.S. application Ser. No. 16/670,556 filed Oct. 31, 2019, which is a Continuation of U.S. application Ser. No. 15/893,366 filed Feb. 9, 2018, now U.S. Pat. No. 10,528,078 issued Jan. 7, 2020, which is a Continuation of U.S. application Ser. No. 14/618,517 filed Feb. 10, 2015, now U.S. Pat. No. 9,891,663 issued Feb. 13, 2018, which claims priority from Korean Patent Application No. 10-2014-0089251 filed on Jul. 15, 2014, in the Korean Intellectual Property Office, and the benefit of United States Provisional Application No. 61/937,778 filed on Feb. 10, 2014, in the United States Patent and Trademark Office, the disclosures of which are incorporated herein by reference in their entireties.

BACKGROUND

1. Field

Aspects of the exemplary embodiments relate to a user terminal device and a displaying method thereof, and more particularly, to a user terminal device, a display of which is divided into a plurality of display areas by a plurality of hinges, and a displaying method thereof.

2. Description of the Related Art

With the development of electronic technology, various types of user terminal devices have been developed and distributed. Recently, the size of such user terminal devices has been minimized while the functions of the devices have become diverse and thus, the demands for user terminal devices have been continuously increasing.

A user terminal device may provide various contents, such as multimedia contents and application screens based on a user's request. A user may select a desired function using a button or a touch screen provided on a user terminal device. A user terminal device may selectively execute a program, according to a user interaction and display the result of execution.

As a user terminal device provides increasingly diverse functions, there is a growing need for a method of displaying contents and a user interface method. In other words, as the method of displaying contents has changed, and the type and function of contents have been increasing, the existing interaction method of simply selecting a button or touching a screen may be insufficient to efficiently perform the various functions of a user terminal device.

Accordingly, there is an increasing need of a user interaction method which enables a user to more conveniently and efficiently use a user terminal device.

SUMMARY

Aspects of the exemplary embodiments relate to a user terminal device which provides various functions according to a bending state of a display divided into a plurality of display areas by a plurality of hinges and a displaying method thereof.

According to an aspect of an exemplary embodiment, there is provided a method of displaying information on a user terminal device comprising a display configured to be divided into a first display area, a second display area, and a third display area along a first folding line and a second folding line respectively, the method including displaying an execution screen of an application including a first function on the first display area, displaying, in response to the display being unfolded with reference to the first folding line, an execution screen of the application which provides the first function and a second function, related to the first function, in the first display area and the second display area, and displaying, in response to the display being unfolded with reference to the second folding line, while the execution screen of the application including the first function and the second function is displayed on the first display area and the second display area, an execution screen of the application including the first function, the second function, and a third function, related to the second function, in the first display area, the second display area, and the third display area.

The first display area and the second display area are unfolded with reference to the first folding line, and the first display area and the third display area are unfolded with reference to the second folding line.

If the first display area and the second display area are unfolded with reference to the first folding line, the first display area and the second display area are located on the same plane or the first display area and the second display area are simultaneously visible to a user.

The first function, the second function, and the third function may be functions for controlling same content.

The application including the first function, the application including second function, and the application including the third function are the same application.

The displaying the execution screen of the application includes selecting a mode from among a plurality of modes for displaying the application according to an unfolded state of the display, wherein a first mode among the plurality of modes comprises applying a layout and a user interface corresponding to an application to the first display area, wherein a second mode among the plurality of modes comprises applying a layout and a user interface corresponding to an application to the first display area and the second display area, and wherein a third mode among the plurality of modes comprises applying a layout and a user interface corresponding to an application to the first display area, the second display area, and the third display area.

In response to the first function, the second function, and the third function being functions for controlling an audio content, the first function is a function for playing back a first audio content, the second function is a function of mixing the first audio content and a second audio content, and the third function is a function of editing at least one of the first audio content and the second audio content.

The first function, the second function, and the third function are functions for controlling an image content, the first function is a function for displaying the image content, and one of the second function and the third function is a function for editing the image content.

The first function, the second function, and the third function are functions for performing a telephone call, the first function is a function for performing a telephone call with a first party, the second function is a function for simultaneously performing a telephone call with the first party and a second party, and third function is a function for performing a video call with at least one of the first party and the second party.

According to an aspect of another exemplary embodiment, there is provided a user terminal device which includes a first hinge, a second hinge, a display configured to be divided into a first display area, a second display area, and a third display area along a first folding line corresponding to the first hinge and a second folding line corresponding to the second hinge, a detector configured to detect at least one of a first bending interaction of unfolding the display with reference to the first folding line and a second bending interaction of unfolding the display with reference to the second folding line, and a controller configured to, in response to the first bending interaction being detected through the detector, control the display to display an execution screen of the application including the first function and a second function, related to the first function, in the first display area and the second display area, and in response to the second bending interaction being detected through the detector, while the execution screen of the application including the first function and the second function is displayed in the first display area and the second display area, control the display to display an execution screen of the application including the first function, the second function, and a third function, related to the second function, in the first display area, the second display area, and the third display area.

The first bending interaction of unfolding the display with reference to the first folding line comprises a bending interaction of unfolding the first display area and the second display area with reference to the first folding line, and wherein the second bending interaction of unfolding the display with reference the second folding line comprises a bending interaction of unfolding the first display area and the third display area with reference to the second folding line.

The first bending interaction of unfolding the display with reference to the first folding line comprises a bending interaction of unfolding the display so that the first display area and the second display area are located on the same plane or the first display area and the second display area are simultaneously visible to a user.

The first function, the second function, and the third function may be functions for controlling same content.

The application including the first function, the application including the second function, and the application including the third function are the same application.

The controller is further configured to control the display to select a mode from among a plurality of modes according to an unfolded state of the display and to display the execution screen of the application by in the selected mode, wherein a first mode among the plurality of modes comprises applying a layout and a user interface corresponding to the application to the first display area, wherein a second mode among the plurality of modes comprises applying a layout and a user interface corresponding to the application to the first display area and the second display area, and wherein a third mode among the plurality of modes comprises applying a layout and a user interface corresponding to the application to the first display area, the second display area, and the third display area.

The first function, the second function, and the third function are functions for controlling an audio content, the first function is a function for playing back a first audio content, the second function is a function of mixing the first audio content and a second audio content, and the third function is a function of editing at least one of the first audio content and the second audio content.

The first function, the second function, and the third function are functions for controlling an image content, the first function is a function for displaying the image content, and one of the second function and the third function is a function for editing the image content.

The first function, the second function, and the third function are functions for performing a telephone call, the first function is a function for performing a telephone call with a first party, the second function is a function for simultaneously performing a telephone call with the first party and a second party, and the third function is a function for performing a video call with at least one of the first party and the second party.

According to an aspect of an exemplary embodiment, there is provided A non-transitory computer readable recording medium in which a program for displaying an execution screen of an application on a display, configured to be divided into the first display area, a second display area, and a third display area along a first folding line and a second folding line, is stored, the program including displaying an execution screen of an application including a first function to a first display area, displaying, in response to the display being unfolded with reference to the first folding line, an execution screen of the application including the first function and a second function, related to the first function, in the first display area and the second display area, and displaying, in response to the display being unfolded with reference to the second folding line, while the execution screen of the application including the first function and the second function is displayed on the first display area and the second display area, an execution screen of the application including the first function, the second function, and a third function, related to the second function, in the first display area, the second display area, and the third display area.

The first function, the second function, and the third function may be functions for controlling same content.

According to the above-described various aspects of the exemplary embodiments, various user experiences may be provided through a user terminal device including a display which may be bent with reference to a plurality of hinges.

BRIEF DESCRIPTION OF THE DRAWINGS

The above and/or other aspects will be more apparent by describing certain exemplary embodiments with reference to the accompanying drawings, in which:

FIG. 4 depicts a view explaining configuration of software stored in a storage, according to an exemplary embodiment;

FIGS. 6A to 8B depict views illustrating exemplary embodiments of various functions of a user terminal device performed according to a bending interaction, according to various exemplary embodiments;

FIGS. 9A to 26 depict views illustrating exemplary embodiments where various functions of a user terminal device are performed according to a shape of the user terminal device changed in response to detection of a bending interaction, according to various exemplary embodiments.

DETAILED DESCRIPTION OF THE EXEMPLARY EMBODIMENTS

Figure 1:
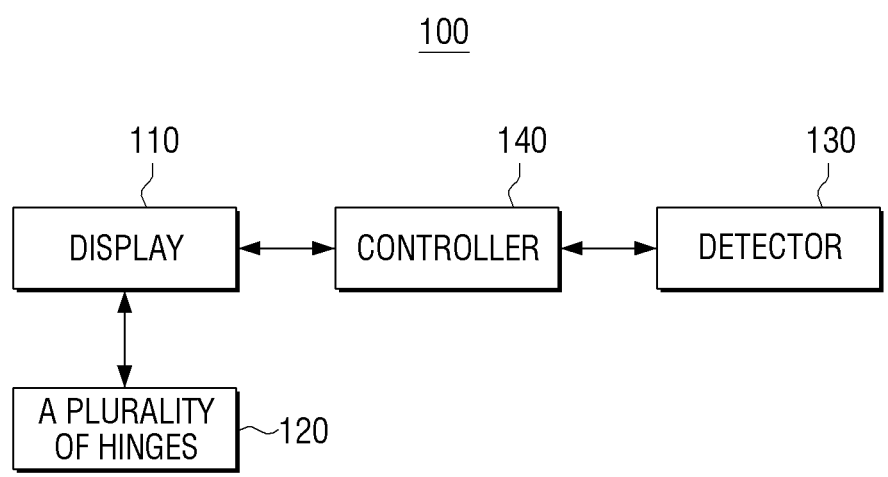
FIG. 1 depicts a block diagram illustrating configuration of a user terminal device, according to an exemplary embodiment.

Hereinafter, certain exemplary embodiments will be described in greater detail with reference to the accompanying drawings.

The exemplary embodiments may vary, and may be provided in different forms. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the invention, the specific description is omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters.

FIG. 1 depicts a block diagram illustrating a configuration of a user terminal device 100, according to an exemplary embodiment. As illustrated in FIG. 1, the user terminal device 100 includes a display 110, a plurality of hinges 120, a detector 130, and a controller 140. In this case, the user terminal device 100 may be realized as various types of devices such as Television (TV), Personal Computer (PC), laptop PC, mobile phone, tablet PC, Personal Digital Assistant (PDA), MP3 player, kiosk, electronic album, table display device, etc. If a user terminal device is realized as portable device such as mobile phone, tablet PC, PDA, MP3 player, laptop PC, etc., the user terminal device may be referred to a mobile device, but is not limited thereto. Hereinafter, the user terminal device will be referred to as a user terminal device.

The display 110 displays various image data and User Interfaces (UIs). In particular, the display 110 may be realized as a touch screen combined with a touch detector 130. In addition, the display 110 may be bent by a folding line corresponding to the plurality of hinges 120. Specially, in an exemplary embodiment, two hinges 120 are included, and the display 110 may be divided into a first, a second and a third display area by the two hinges 120.

The plurality of hinges 120 allow the display 110 to be bent with reference to a plurality of folding lines corresponding to the plurality of hinges 120. Specially, according to an exemplary embodiment, the user terminal device 110 may include two hinges 120. Meanwhile, the folding line corresponding to the hinge 120 may be a line where two areas among a plurality of display areas included in the display 110 may be completely bent with reference to the folding line.

The detector 130 detects a user interaction. In particular, the detector 130 may include a touch detector for detecting a user touch interaction. In addition, the detector 130 may include a bending detector for detecting a bending interaction of bending the display 110 with reference to a folding line and an unfolding interaction of unfolding the display 110 with reference to a folding line.

The controller 140 controls overall operations of the user terminal device 100.

In particular, in response to a detection of the first bending interaction of unfolding the display with reference to the first folding line among a plurality of folding lines, being detected through the detector, while an execution screen of an application which provides the first display area with a first function is displayed in the first display area, the controller 140 may control the display to display an execution screen of an application which provides the first function and a second function related to the first function in the first display area and the second display area. In addition, in response to a detection of a second bending interaction of unfolding the display with reference to the second folding line from among the plurality of folding lines, being detected through the detector, while the execution screen of the application which provides the first function and the second function is displayed in the first display area and the second display area, the controller 140 may control the display to display an execution screen of an application which provides the first function, the second function, and a third function related to the second function in the first display area, the second display area, and the third display area, according to an exemplary embodiment.

According to the above exemplary embodiment, the first bending interaction may be a bending interaction of unfolding the first display area and the second display area with reference to the first folding line. In addition, the second bending interaction may be a bending interaction of unfolding the second display area and the third display area with reference to the second folding line. In addition, the first bending interaction may be a bending interaction of unfolding the display such that that the first display area and the second display area are located on the same plane or the first display area and the second display area are both simultaneously visible to the user.

In this case, the first function, the second function, and the third function may be functions for controlling the same content. In addition, the application which provides the first function, the application which provides the second function, and the application which provides the third function may be the same application, according to an exemplary embodiment.

In response to the first function, the second function, and the third function being functions for controlling an audio content, the first function may be a function for playing back a first audio content, one of the second function and the third function may be a function of mixing the first audio content and a second audio content, and the other one of the second function and the third function may be a function of editing at least one of the first audio content and the second audio content, according to an exemplary embodiment.

In response to the first function, the second function, and the third function being functions for controlling an image content, the first function may be a function for displaying the image content, and one of the second function and the third function may be a function of editing the image content, according to an exemplary embodiment.

In addition, in response to the first function, the second function, and the third function being functions for performing a telephone call, the first function may be a function for performing a telephone call with a first party, one of the second function and the third function may be a function of simultaneously performing a telephone call with the first party and a second party, and the other one of the second function and the third function may be a function of performing a video call with at least one of the first party and the second party, according to an exemplary embodiment.

According to the above described various exemplary embodiments, a user is able to execute various functions of the user terminal device 100 by using the display 110 which may be bent using the plurality of hinges 120.

Figure 2:
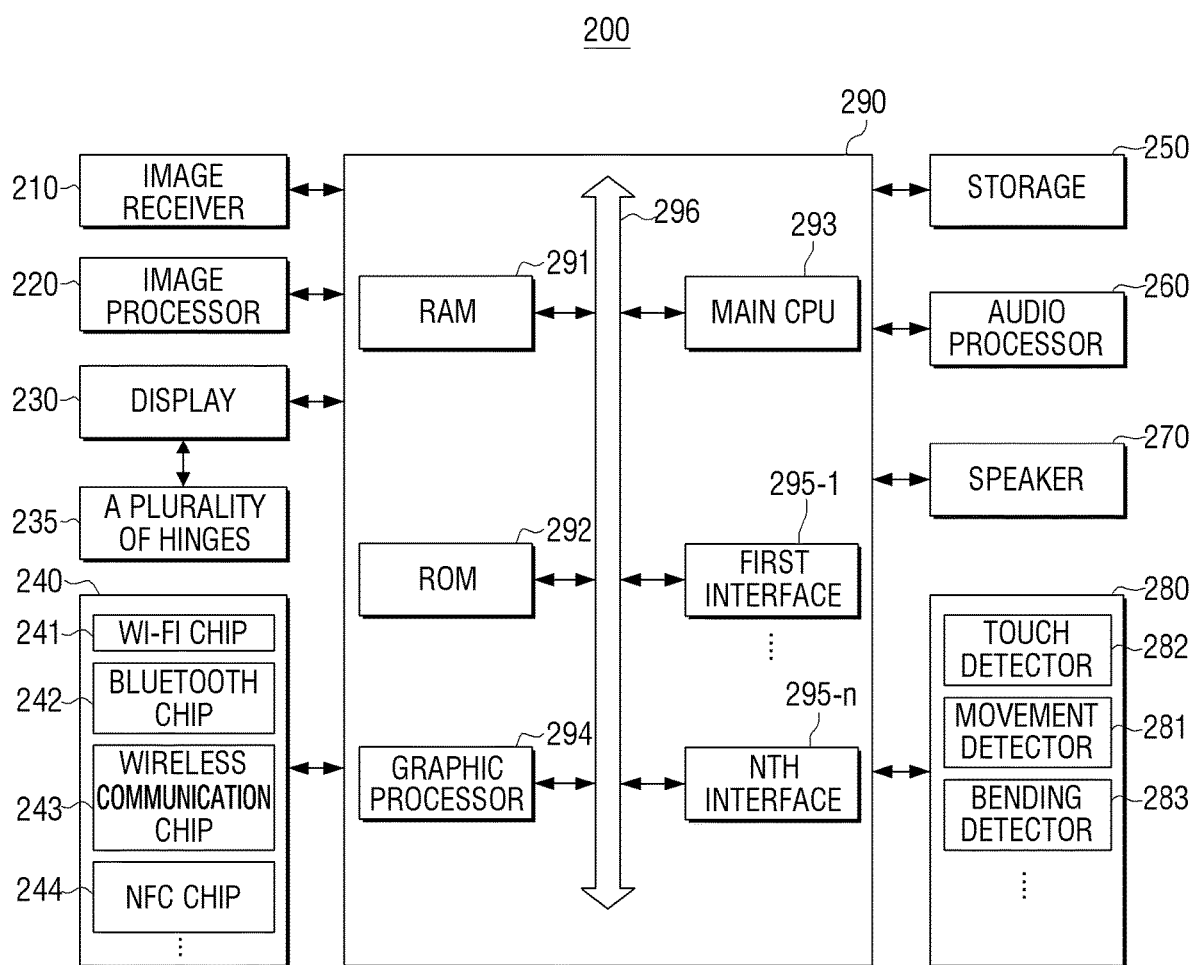
FIG. 2 depicts a block diagram illustrating a detailed configuration of a user terminal device, according to an exemplary embodiment.

Hereinafter, an exemplary embodiment will be described in greater detail with reference to FIGS. 2 to 12B. FIG. 2 depicts a block diagram illustrating detailed configuration of a user terminal device 200, according to an exemplary embodiment. As illustrated in FIG. 2, the user terminal device 200 includes an image receiver 210, an image processor 220, a display 230, a plurality of hinges 235, a communicator 240, a storage 250, an audio processor 260, a speaker 270, a detector 280, and a controller 290.

Meanwhile, FIG. 2 illustrates various components comprehensively, assuming that the user terminal device 200 is an apparatus having various functions such as contents providing function, display function, etc. Accordingly, depending on exemplary embodiments, a part of the components illustrated in FIG. 2 may be omitted or changed, or other components may be further added.

The image receiver 210 receives image data through various sources. For example, the image receiver 210 may receive broadcasting data from an external broadcasting station, Video On Demand (VOD) data in real time from an external server, or image data from an external apparatus.

The image processor 220 processes image data received from the image receiver 210. The image processor 220 may perform various image processing with respect to image data, such as decoding, scaling, noise filtering, frame rate conversion, resolution conversion, etc.

The display 230 displays at least one of a video frame which is generated as the image processor 220 processes image data received from the image receiver 210 and various screens generated by a graphic processor 294.

Figure 3A:
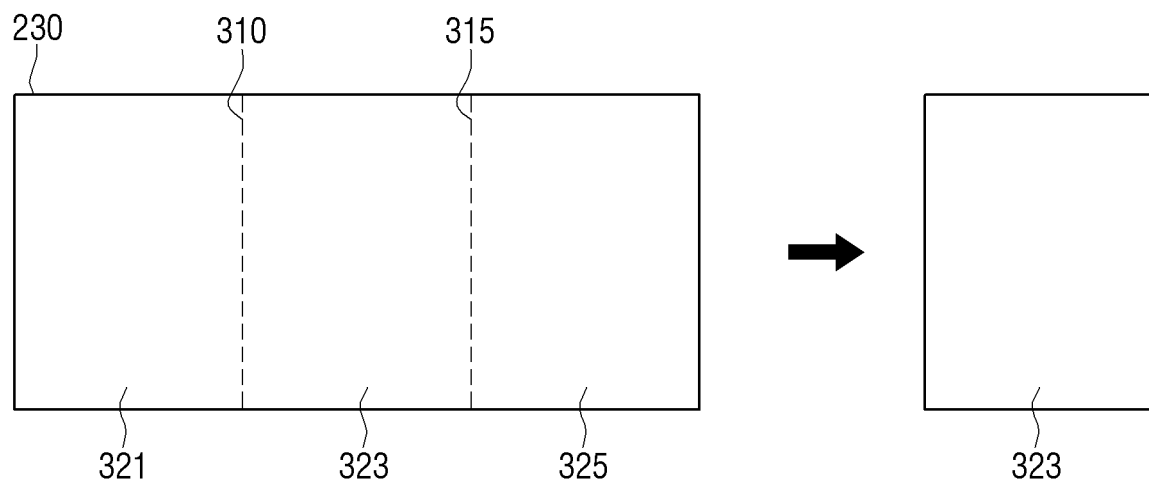
FIGS. 3A to 3C depict views illustrating a user terminal device which may be bent by two hinges, according to an exemplary embodiment.

In particular, as illustrated in FIG. 3A, the display 230 may consist of a first display area 321, a second display area 323, and a third display area 325 with reference to two folding lines 310, 315. In this case, the first folding line 310 may correspond to a location of the first hinge, and the second folding line 315 may correspond to a location of the second hinge.

In addition, the display 230 may be bent with reference to the plurality of hinges 235. In particular, the third display area 325 of the display 230 may be bent in a direction of a rear side of the second display area 323 with reference to the second hinge first, and then the first display area 321 of the display 230 may be bent in the direction of the rear side of the second display area 323 with reference to the first hinge, according to an exemplary embodiment. That is, as illustrated in FIG. 3A, the display 230 may be bent in such a way that the second display area 323 is exposed outside to the user.

Figure 3B:
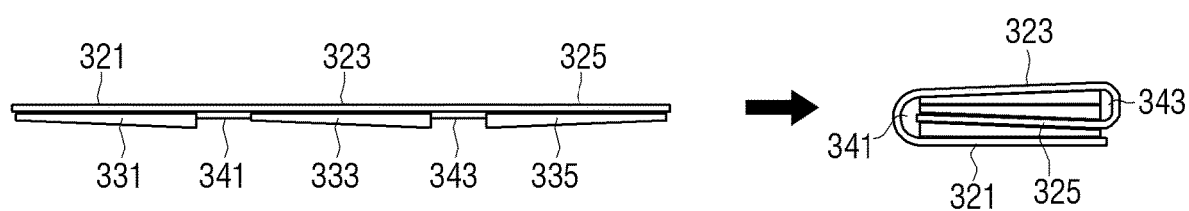
Figure 3C:
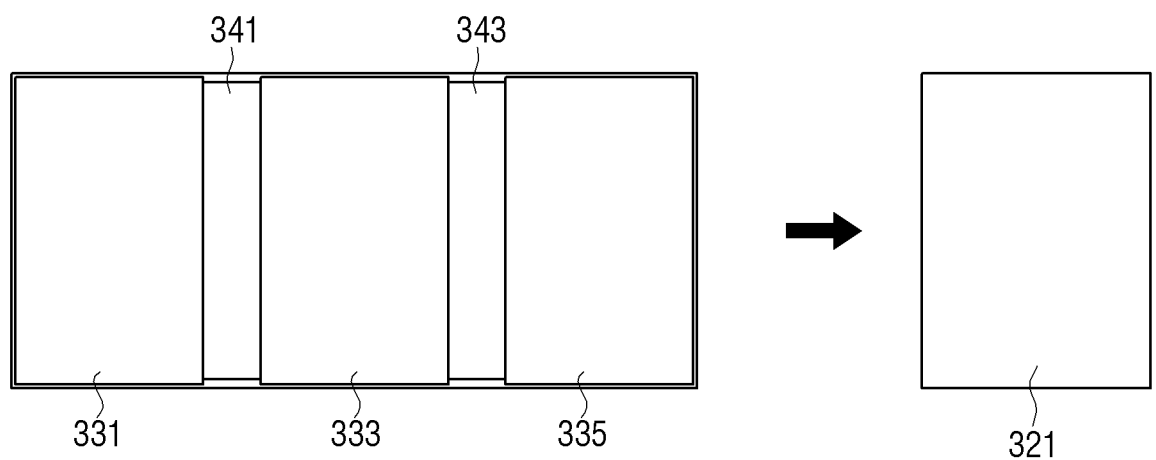

FIGS. 3B and 3C depict views illustrating a side surface and a rear surface of the user terminal device 200 in an unfolded state and a side surface and a rear surface of the user terminal device 200 in a bent state. The rear surface of the user terminal device 200 may include a plurality of covers 331, 333, 335 which respectively correspond to the plurality of display areas 321, 323, 325. In addition, the first hinge 341 and the second hinge 343 may be located between the plurality of covers 331, 333, 335 so that the plurality of display areas 321, 323, 325 may be bent.

Meanwhile, in the above described exemplary embodiment, the first display area 321 and the third display area 325 are bent in the direction of the rear side of the second display area 323 with reference to the first hinge and the second hinge, but this is merely an example. That is, the first display area 321 and the third display area 325 may be bent in a direction of a front side of the second display area 323 with reference to the first hinge and the second hinge, according to another exemplary embodiment.

In addition, in the above described exemplary embodiment, the third display area 325 is bent first, but this is merely an example. That is, the first display area 321 may be bent first, according to another exemplary embodiment.

In addition, in the above described exemplary embodiment, the hinges 341, 343 are located outside the display, but this is merely an example. That is, the hinges 341, 343 may be located inside the display so that the display is bent, according to another exemplary embodiment.

In addition, the display 230 may be realized as a flexible display so as to be bent by a folding line, but this is merely an example. That is, the display 230 may be realized as a plurality of display panels which are connected by a plurality of hinges, according to another exemplary embodiment.

The plurality of hinges 235 allows the display 230 to be bent with reference to corresponding folding lines. In particular, the plurality of hinges 235 may consist of the first hinge and the second hinge, and the first hinge and the second hinge may be located in parallel.

The communicator 240 performs communication with various types of external apparatuses according to various types of communication methods. The communicator 240 may include a Wireless Fidelity (Wi-Fi) chip 241, a Bluetooth chip 242, a wireless communication chip 243, and a Near Field Communication (NFC) chip 244. The controller 290 may perform communication with various external apparatuses using the communicator 240.

In particular, the Wi-Fi chip 241 and the Bluetooth chip 242 perform communication according to a Wi-Fi method and a Bluetooth method, respectively. In the case of the Wi-Fi chip 241 or the Bluetooth chip 242, various connection information such as Subsystem Identification (SSID) and a session key may be transmitted/received first for communication connection and then, various information may be transmitted/received. The wireless communication chip 243 represents a chip which performs communication according to various communication standards such as Institute of Electrical and Electronics Engineers (IEEE), Zigbee, 3rd Generation (3G), 3rd Generation Partnership Project (3GPP), Long Term Evolution (LTE), and so on. The NFC chip 244 represents a chip which operates according to an NFC method which uses 13.56 MHz band among various Radio Frequency-Identification (RF-ID) frequency bands such as 135 kHz, 13.56 MHz, 433 MHz, 860~960 MHz, 2.45 GHz, and so on.

The storage 250 may store various programs and data necessary to operate the user terminal device 200. Specifically, the storage 250 may store programs and data to configure various screens to be displayed on a main area and a sub area. FIG. 4 depicts a view explaining the structure of software stored in the user terminal device 200. According to FIG. 4, the storage 250 may store software including an Operating System (OS) 410, a kernel 420, middleware 430, an application 440, etc.

The OS 410 controls and manages overall operations of hardware. In other words, the OS 410 manages hardware and is responsible for basic functions such as memory and security.

The kernel 420 serves as a path transmitting various signals detected at the display 230, such as a touch signal, to the middleware 430.

The middleware 430 includes various software modules for controlling the operation of the user terminal device 200. According to FIG. 4, the middleware 430 includes an X11 module 430-1, an APP manager 430-2, a connection manager 430-3, a security module 430-4, a system manager 430-5, a multimedia framework 430-6, a UI framework 430-7, a window manager 430-8, and a sub UI framework 430-9.

The X11 module 430-1 receives various event signals from various hardware provided in the user terminal device 200. Herein, the event may vary, ranging from an event where a user gesture is detected, an event where a system alarm occurs, an event of executing to and event terminating a specific program, etc.

The APP manager 430-2 manages the execution state of various applications 440 which are installed in the storage 250. When an application execution event is detected from the X11 module 430-1, the APP manager 430-2 calls and executes an application corresponding to the event.

The connection manager 430-3 supports wired or wireless network connection. The connection manager 430-3 may include various detailed modules such as a DNET module, a Universal Plug And Play (UPnP) module, etc.

The security module 430-4 supports certification, permission, secure storage, etc. with respect to the hardware.

The system manager 430-5 monitors the state of each element of the user terminal device 200, and provides the monitoring result to other modules. For example, if there is not enough battery left, an error occurs, or connection is cut off, the system manager 430-5 may provide the monitoring result to a main UI framework 430-7 or a sub UI framework 430-9 and may output an alarm message or an alarm sound.

The multimedia framework 430-6 may reproduce multimedia contents stored in the user terminal device 200 or provided from an external source. The multimedia framework 430-6 may include a player module, a camcorder module, a sound processing module, etc. Accordingly, the multimedia framework 430-6 may reproduce various multimedia contents and generate and reproduce screens and sounds.

The main UI framework 430-7 provides various UIs to be displayed on a main area of the display 230, and the sub UI framework 430-9 provides various UIs to be displayed on a sub area. The main UI framework 430-7 and the sub UI framework 430-9 may include an image composite module to configure various objects, a coordinates composite module to calculate coordinates where an object is to be displayed, a rendering module to render the configured object on the calculated coordinates, a 2-dimensional (2D)/3-dimensional (3D) UI toolkit to provide a tool for configuring a UI in 2D or 3D form, etc.

The window manager 430-8 may detect a touch event using a user's body part or pen, or other input events. When such an event is detected, the window manager 430-8 transmits an event signal to the main UI framework 430-7 or the sub UI framework 430-9 so that an operation corresponding to the event is performed.

In addition, if a user touches and drags a screen, various program modules such as a writing module for drawing a line according to a drag trace and an angle calculation module for calculating a pitch angle, a roll angle, a yaw angle, etc. based on a sensor value sensed by a movement detector 281 may be stored.

The application module 440 includes applications 440-1 to 440-$n$ for supporting various functions. For example, program modules for providing various services, such as a navigation program module, a game module, an electronic book module, a calendar module, an alarm management module, etc. may be included. Such applications may be set as default or may be set temporarily by a user when necessary. If an object is selected, the main CPU 293 may execute an application corresponding to the selected object using the application module 440.

The software structure displayed in FIG. 4 is only an example and thus, an exemplary embodiment is not necessarily limited thereto. Thus, part of the structure may be omitted or changed, or new structure may be added, if necessary. For example, the storage 250 may additionally provide various programs such as a sensing module for analyzing signals sensed by various sensors, a messaging module including a messenger program, a Short Message Service (SMS) & Multimedia Message Service (MMS) program, an e-mail program, a call info aggregator program module, a VoIP module, a web browser module, etc.

Referring back to FIG. 2, the audio processor 260 processes audio data of image contents. The audio processor 260 may perform various processing operations such as decoding, amplification, noise filtering, etc. with respect to audio data. The audio data processed by the audio processor 260 may be output to the audio output unit 270.

The audio output unit 270 outputs not only various audio data, which is processed in many ways such as decoding, amplification, and noise filtering by the audio processor 260, but also various alarm sounds or voice messages. In particular, the audio output unit 270 may be realized as a speaker, but this is only an example. The audio output unit 270 may be realized as an output terminal which may output audio data, according to another exemplary embodiment.

The detector 280 detects various user interactions. In particular, the detector 280 may include a touch detector 282, a movement detector 281, and a bending detector 283 as illustrated in FIG. 2.

Specifically, the touch detector 282 may detect a user's touch interaction using a touch panel attached to a rear side of a display panel. The movement detector 281 may detect a movement (for example, a rotation movement) of the user terminal device 100 using at least one of an accelerator sensor, a geomagnetic sensor, and a gyro sensor. The bending detector 283 may detect at least one of whether the user terminal device 200 is bent with reference to a folding line and the angle at which the terminal device 200 is bent using a bending detector, an illuminance sensor, etc.

Meanwhile, the touch detector 282 may activate only a touch sensor disposed on an exposure area while the display 230 is bent and inactivate a touch sensor disposed on the other areas. In this case, the bending state of the display 230 may include both of a state where the display 230 is completely bent with reference to the hinge 241 and 243 and a state where the display areas are bent at a predetermined angle with reference to the hinge 241 and 243, according to an exemplary embodiment.

The controller 290 controls overall operations of the user terminal device 200 using various programs stored in the storage 250.

As illustrated in FIG. 2, the controller 290 includes a Random Access Memory (RAM) 291, a Read-Only Memory (ROM) 292, a graphic processor 294, a main Central Processing Unit (CPU) 293, a first to an nth interface 295-1 to 295-n, and a bus 296. In this case, the RAM 291, the ROM 292, the graphic processor 294, the main CPU 293, the first to the nth interface 295-1~295-n, etc. may be interconnected through the bus 296.

The ROM 292 stores a set of commands for system booting. If a turn-on command is input and thus, power is supplied, the main CPU 293 copies O/S stored in the storage 250 in the RAM 291 according to a command stored in the ROM 292, and boots a system by executing the O/S. When the booting is completed, the main CPU 293 copies various application programs stored in the storage 250, in the RAM 291, and executes the application programs copied in the RAM 291 to perform various operations.

The graphic processor 294 generates a screen including various objects such as an icon, an image, a text, etc. using a computing unit (not shown) and a rendering unit (not shown). The computing unit computes property values such as coordinates, shape, size, and color of each object to be displayed according to the layout of the screen using a control command received from the detector 280. The rendering unit generates a screen with various layouts including objects based on the property values computed by the computing unit. The screen generated by the rendering unit is displayed in a display area of the display 230.

The main CPU 293 accesses the storage 250 and performs booting using the O/S stored in the storage 250. The main CPU 293 performs various operations using various programs, contents, data, etc. stored in the storage 250.

The first to the nth interface 295-1 to 295-n are connected to the above-described various elements. One of the above interfaces may be a network interface which is connected to an external apparatus via a network.

In particular, the controller 290 may perform various functions according to a bending state of the display 230, detected through the bending detector 283.

Operating Mode

The controller 290 may operate in a plurality of operating modes according to a bending state of the display 230, detected through the bending detector 283. In this case, the plurality of operating modes may include a phone mode, a note modem and a tablet mode, according to an exemplary embodiment.

Figure 5A:
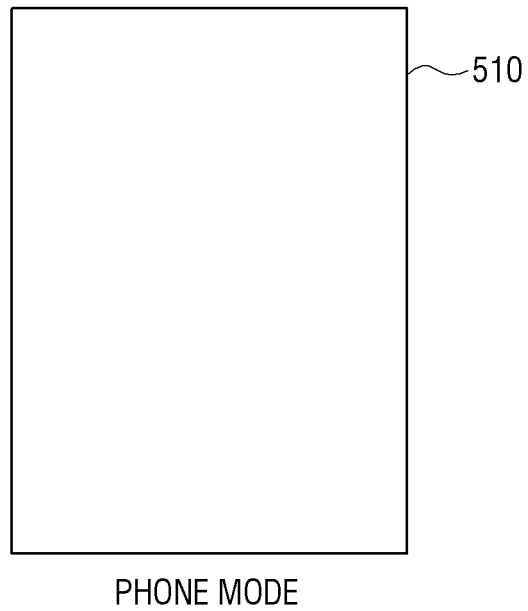
FIGS. 5A to 5C depict views illustrating a plurality of modes according to a bending state of a user terminal device, according to an exemplary embodiment.

Specially, as illustrated in FIG. 5A, in response to each of the first display area 321 and the third display area 325, being detected through the bending detector 283, as being bent in a direction of a rear side of the second display area 323 with reference to two hinges, the controller 290 may operate in a phone mode 510 where an image is displayed in one display area (for example, the second display area), according to an exemplary embodiment.

Figure 5B:
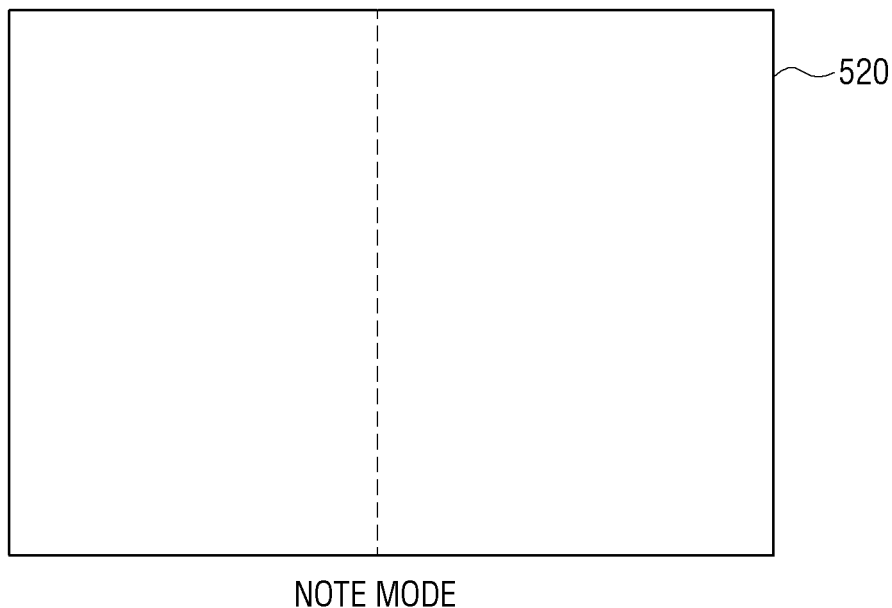

In addition, as illustrated in FIG. 5B, in response to one of the first display area 321 and the third display area 325 being detected through the bending detector 283 as being bent in the direction of the rear side of the second display area 323 with reference to one of the two hinges, the controller 290 may operate in a note mode 520 where images are displayed in two display areas (for example, the first display area and the second display area), according to an exemplary embodiment.

Figure 5C:
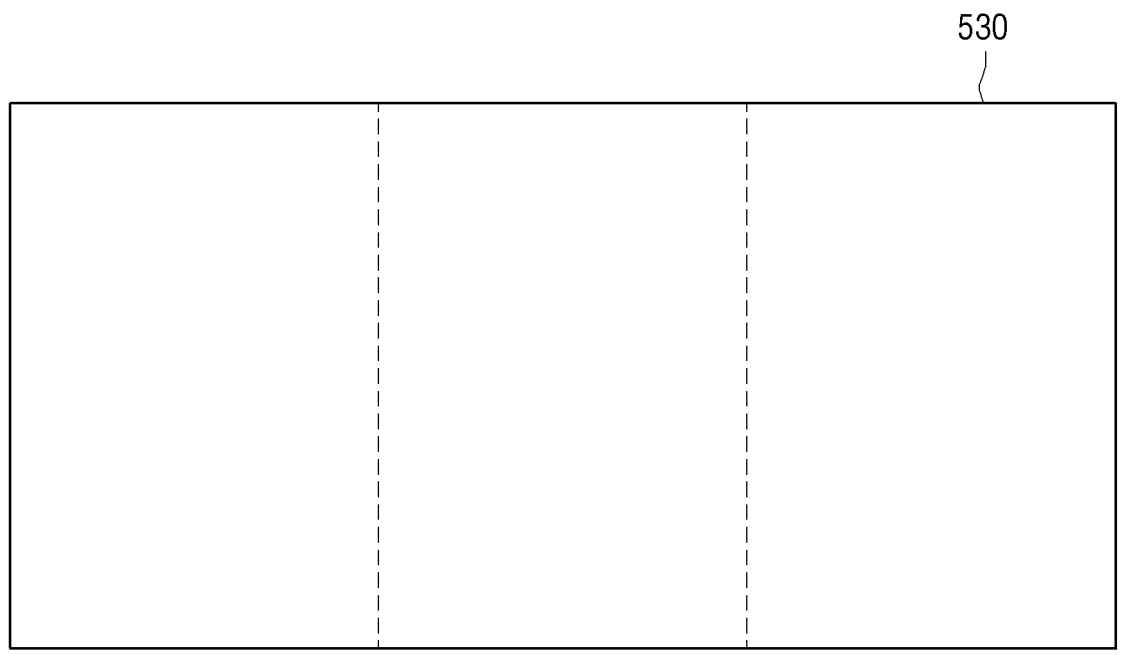

In addition, as illustrated in FIG. 5C, in response to one of the first to the third display areas 321, 323, 325 being detected through the bending detector 283 as being unfolded, the controller 290 may operate in a tablet mode 530 where images are displayed in the first to the third display areas 321, 323, 325, according to an exemplary embodiment.

In particular, the controller 290 may change an area where the touch detector 282 is activated according to the operating mode. For example, in case of the phone mode 510, the controller 290 may activate only a touch sensor corresponding to the second display area 323 out of the touch detector 282 and inactivate the touch sensors corresponding to the first display area 321 and the third display area 323. In addition, in case of the note mode 520, the controller 290 may activate only touch sensors corresponding to the first display area 321 and the second display area 323 out of the touch detector 282 and deactivate the touch sensor corresponding to the third display area 323. In case of the tablet mode 530, the controller 290 may activate touch sensors corresponding to all display areas 321, 323, 325.

In addition, the controller 290 may control the display 230 to vary the display configuration according to an operating mode. In particular, the controller 290 may differently configure a size of a text and an image, an arrangement of a text and an image, and the like according to an operating mode. For example, the controller 290 may display a size of a text and an image when operating in the phone mode 510 to be smaller than a size of a text and an image when operating in the note mode 520 and may display a size of a text and an image when operating in the note mode 520 to be smaller than a size of a text and an image when operating in the tablet mode 530.

Execution of Functions According to a Bending Interaction

The controller 290 may perform different functions according to a location of a display area from which a bending interaction is detected.

According to an exemplary embodiment, in response to a bending interaction of bending one of the first to third display areas being detected while an image content is displayed in the display 230, the controller 290 may store the image content in a different area of the storage 250 according to a location of the display area from which the bending interaction is detected.

Specially, as illustrated in FIG. 6A, in response to a bending interaction of bending a first display area 610 in a direction of a rear side of the display 230 within a predetermined angle range (for example, 10 degrees to 60 degrees), with reference to the first hinge being detected, through the bending detector 283, while an image content is displayed in the first to third display areas 610 to 630, when the display 230 is in an unfolded state, the controller 290 may store the image content in a first area in the storage 250.

In addition, in response to a bending interaction of bending the third display area 630 in the direction of the rear side of the display 230 within a predetermined angle range (for example, 10 degrees to 60 degrees), with reference to the second hinge being detected, through the bending detector 283, while an image content is displayed in the first to third display areas 610 to 630, when the display 230 is in an unfolded state, the controller 290 may store the image content in a second area in the storage 250.

For example, as illustrated in FIG. 6B, in response to a bending interaction of bending the first display area 610 in the direction of the rear side of the display 230 within a predetermined angle range (for example, 10 degrees to 60 degrees), with reference to the first hinge being detected through the bending detector 283, while a news screen of a news application is displayed in the first to third display areas 610 to 630, when the display 230 is in an unfolded state, the controller 290 may store a news article which is currently displayed in the display 230 in a work folder in the storage 250. In addition, in response to a bending interaction of bending the third display area 630 in the direction of the rear side of the display 230 within a predetermined angle range (for example, 10 degrees to 60 degrees) with reference to the second hinge being detected through the bending detector 283, while the news screen of the news application is displayed in the first to third display areas 610 to 630, when the display 230 is in an unfolded state, the controller 290 may store a news article which is currently displayed in the display 230 in a private folder in the storage 250.

According to another exemplary embodiment, in response to a bending interaction of bending a display area from among the first to third display areas and unfolding the display area again being detected while an image content is displayed in the display 230, the controller 290 may change a screen depicting the image content or change the image content to another image content according to a location of the display area from which the bending interaction is detected.

For example, as illustrated in FIG. 7A, in response to a bending interaction of bending a first display area 710 in the direction of the rear side of the display 230 with reference to the first hinge and unfolding the first display area again being detected through the bending detector 283, while a tenth page of a E-book content is displayed in first to third display areas 710 to 730, when the display 230 is in an unfolded state, the controller 290 may control the display 230 to display a ninth page that is a previous page of the E-book.

Figure 7B:
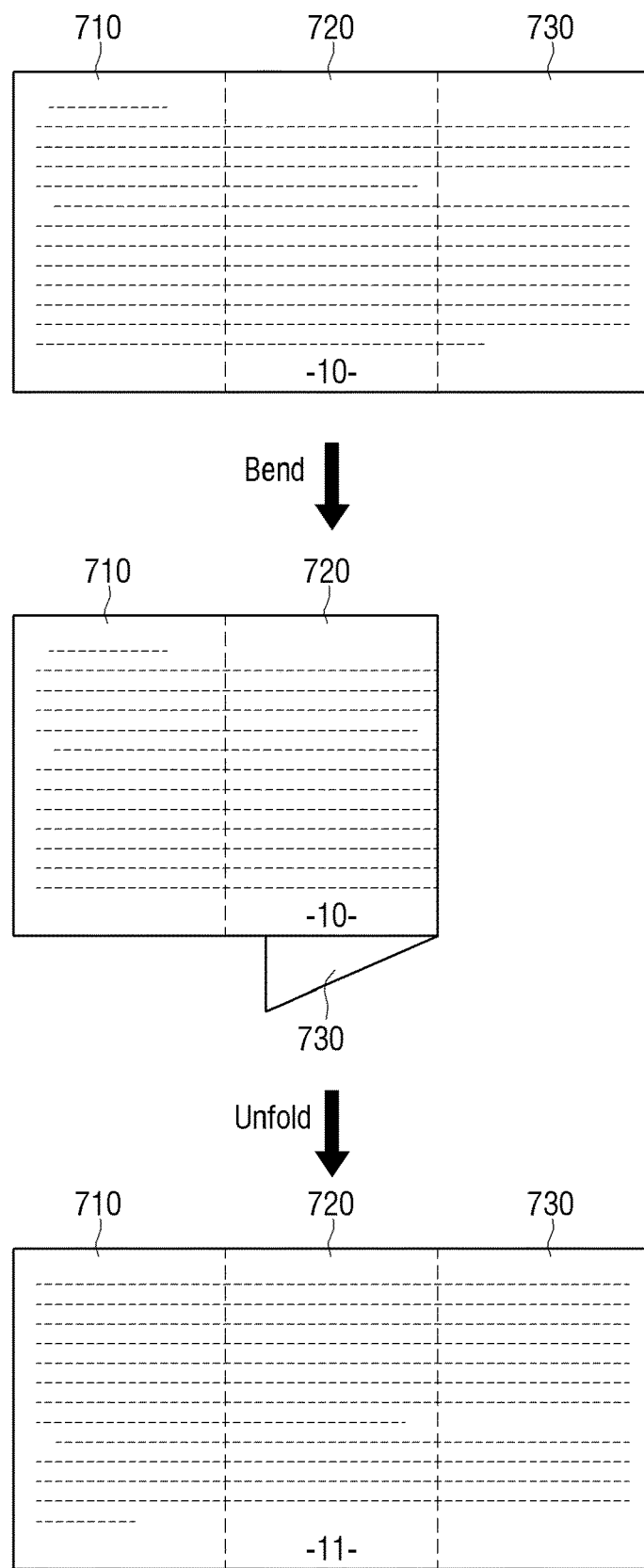

In addition, as illustrated in FIG. 7B, in response to a bending interaction of bending the third display area 730 in the direction of the rear side of the display 230 with reference to the second hinge and unfolding the third display area again being detected through the bending detector 283, while the tenth page of the E-book content is displayed in the first to third display areas 710 to 730, when the display 230 is in an unfolded state, the controller 290 may control the display 230 to display an eleventh page that is a next page of the E-book.

That is, a user is able to change a page of the E-book content using a bending interaction.

According to another exemplary embodiment, as illustrated in FIG. 8A, in response to a bending interaction of bending the first display area 810 in the direction of the rear side of the display 230, with reference to the first hinge, and unfolding the first display area 810 again being detected through the bending detector 283 while a first picture content is displayed in first to third display areas 810 to 830, and a gallery application is executed when the display 230 is in an unfolded state, the controller 290 may control the display 230 to display a second picture content which is stored in the gallery application.

Figure 8B:
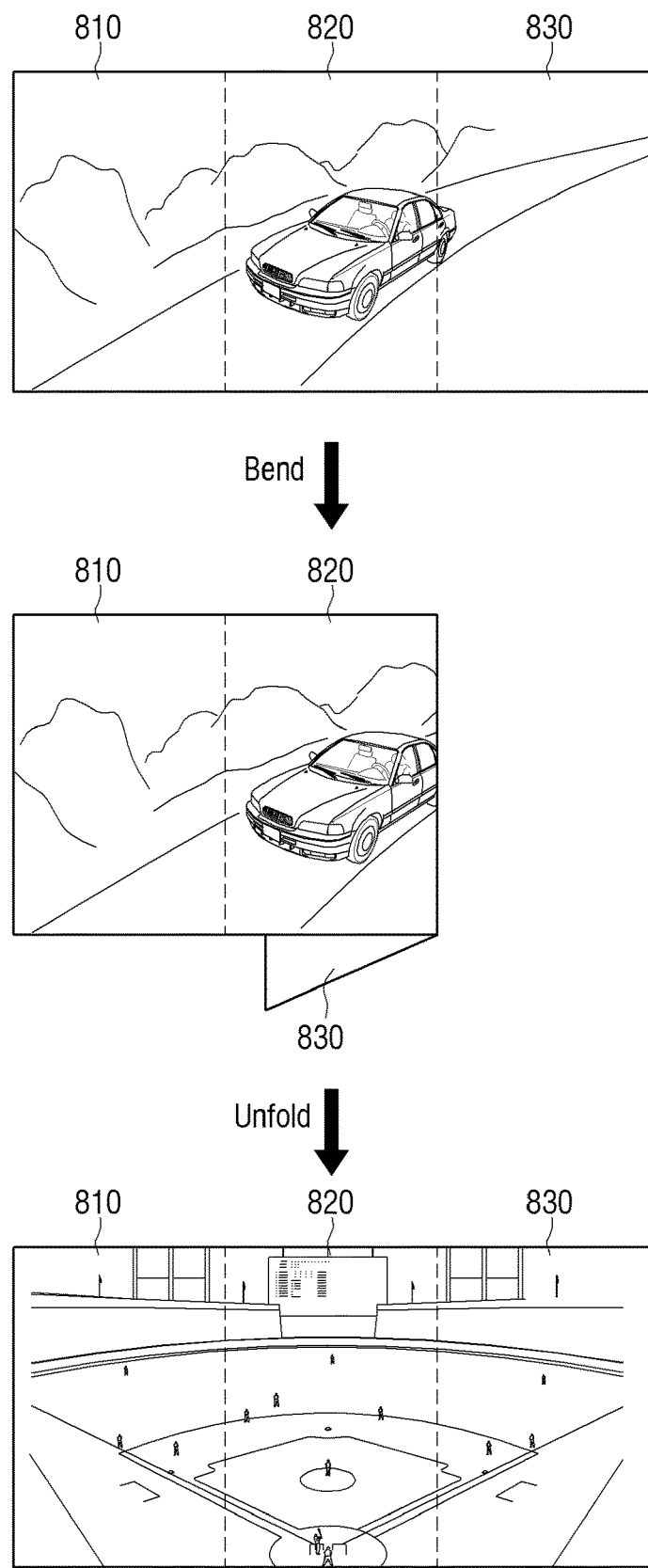

In addition, as illustrated in FIG. 8B, in response to a bending interaction of bending a third display area 830 in the direction of the rear side of the display 230 and unfolding the third display area again with reference to the second hinge being detected through the bending detector 283 while the first picture content is displayed in the first to third display areas 810 to 830, and the gallery application is executed when the display 230 is in an unfolded state, the controller 290 may control the display 230 to display a third picture content which is stored in the gallery application.

That is, a user is able to browse pictures stored in the gallery application using a bending interaction.

Execution of Functions According to a Shape Change of the Display 230

In response to a bending interaction of bending the display 230 so that a shape of the display 230 is changed, being detected through the bending detector 283, while an execution screen of a first application is displayed in the display 230 when the display 230 is in an unfolded state, the controller 290 may control the display 230 to display execution screens of different applications in the first display area and the third display area according to the changed shape of the display 230.

Specially, as illustrated in FIG. 9A, while an execution screen of the gallery application is displayed in the display 230 when the display 230 is in an unfolded state, the bending detector 283 may detect a bending interaction of bending the display 230 so that the first display area 910 is located above the other display areas 920 and 930. For example, the bending detector 283 may detect a bending interaction of bending the first display area 910 and the second display area 920 in a direction of a front side of the display 230 at a predetermined angle (for example, 90 degrees) with reference to the second hinge and bending the first display area 910 in a direction of a rear side of the display 230 at a predetermined angle (for example, 90 degrees) with reference to the first hinge. In response to a bending interaction of bending the display 230 so that the first display area 910 is located above the other display areas 920 and 930, being detected through the bending detector 283, as illustrated in FIG. 9A, the controller 290 may control the display 230 to display an execution screen of a chat application for checking the most recently displayed text message in the first display area 910 and display a part of the execution screen of the gallery application in the third display area 930, according to an exemplary embodiment.

In addition, according to another exemplary embodiment, as illustrated in FIG. 9B, while the execution screen of the gallery application is displayed in the display 230 when the display 230 is in an unfolded state, the bending detector 283 may detect a bending interaction of bending the display 230 so that the third display area 930 is located above the other display areas 910 and 920. For example, the bending detector 283 may detect a bending interaction of bending the second display area 920 and the third display area 930 in the direction of the front side of the display 230 at a predetermined angle (for example, 90 degrees) with reference to the first hinge and bending the third display area 930 in the direction of the rear side of the display 230 at a predetermined angle (for example, 90 degrees) with reference to the second hinge. In response to a bending interaction of bending the display 230 so that the third display area 930 is located above the other display areas 910 and 920 being detected through the bending detector 283, the controller 290 may control the display 230 to display a part of the execution screen of the gallery application in the first display area 910 and display an execution screen of a web search application related to the gallery application in the third display area 930, according to an exemplary embodiment.

That is, the controller 290 may control the display 230 to display different image contents in a plurality of display areas according a bending state of the display 230.

In addition, in response to a bending interaction of bending the display 230 so that a display area among the first to third display areas is located above the other display areas being detected through the bending detector 283, while the first to third display areas respectively display first to third screens, the controller 290 may capture a screen displayed in the display area located above the other display areas.

Specially, as illustrated in an upper side of FIG. 10A, the display 230 may display the execution screen of the chat application in a first display area 1010, display an execution screen of the news application in the second display area 1020, and display the execution screen of the web search screen in the third display area 1030, in an unfolded state. In addition, the bending detector 283 may detect a bending interaction of bending the display 230 so that the first display area 1010 is located above the other display areas 1020 and 1030. For example, the bending detector 283 may detect a bending interaction of bending the first display area 1010 and the second display area 1020 in the direction of the front side of the display 230 at a predetermined angle (for example, 90 degrees) with reference to the second hinge and bending the first display area 1010 in the direction of the rear side of the display 230 at a predetermined angle (for example, 90 degrees) with reference to the first hinge. In response to a bending interaction of bending the display 230 so that the first display area 1010 is located above the other display areas 1020 and 1030 being detected through the bending detector 283, the controller 290 may capture the first display screen 1010 which is located higher from among the first display screen 1010 and a third display screen 1030 as illustrated in FIG. 10A.

Figure 10B:
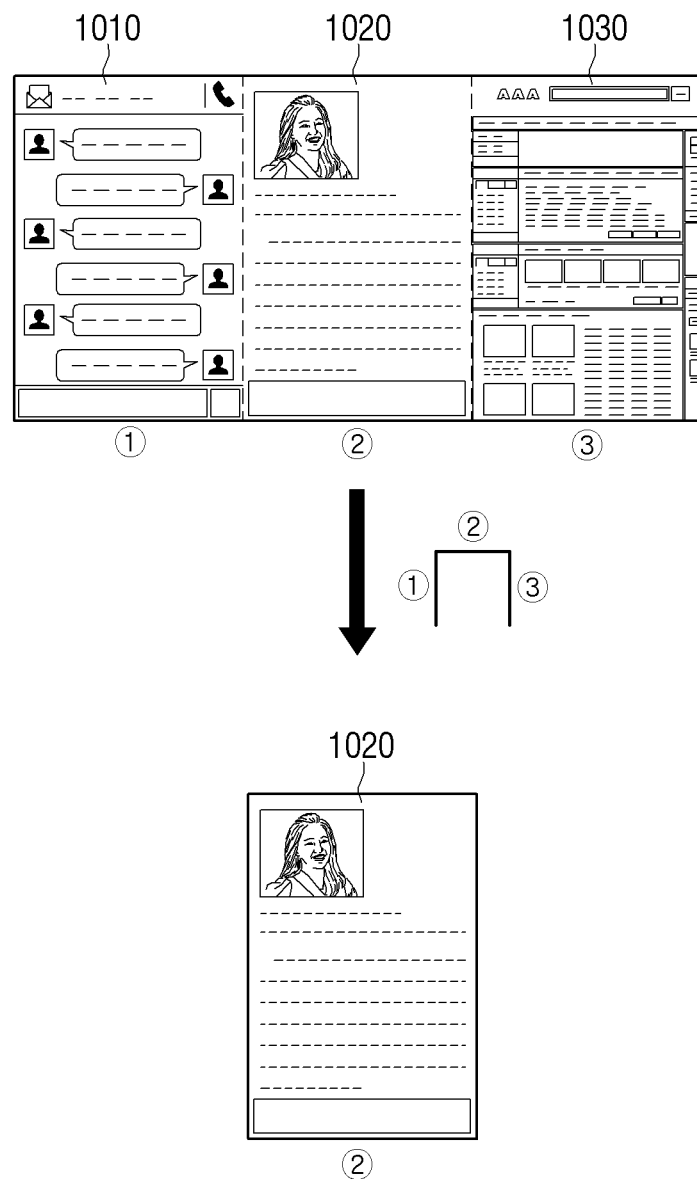

Specially, as illustrated in FIG. 10B, the display 230 may display the execution screen of the chat application in the first display area 1010, display the execution screen of the news application in the second display area 1020, and display the execution screen of the web search screen in the third display area 1030, in an unfolded state. In addition, the bending detector 283 may detect a bending interaction of bending the display 230 so that the second display area 1020 is located above the other display areas 1010 and 1030. For example, the bending detector 283 may detect a bending interaction of bending the first display area 1010 in the direction of the rear side of the display 230 at a predetermined angle (for example, 90 degrees) with reference to the first hinge and bending the third display area 1030 in the direction of the rear side of the display 230 at a predetermined angle (for example, 90 degrees) with reference to the second hinge. In response to a bending interaction of bending the display 230 so that the second display area 1020 is located above the other display areas 1010 and 1030, being detected through the bending detector 283, the controller 290 may capture the second display screen 1020 as illustrated in FIG. 10B.

Specially, as illustrated in FIG. 10C, the display 230 may display the execution screen of the chat application in the first display area 1010, may display the execution screen of the news application in the second display area 1020, and may display the execution screen of the web search screen in the third display area 1030, in an unfolded state. In addition, the bending detector 283 may detect a bending interaction of bending the display 230 so that the third display area 1030 is located above the other display areas 1010 and 1020. For example, the bending detector 283 may detect a bending interaction of bending the second display area 1020 and the third display area 1030 in the direction of the front side of the display 230 at a predetermined angle (for example, 90 degrees) with reference to the first hinge and bending the third display area 1030 in the direction of the rear side of the display 230 at a predetermined angle (for example, 90 degrees) with reference to the second hinge. In response to a bending interaction of bending the display 230 so that the third display area 1030 is located above the other display areas 1010 and 1020 being detected through the bending detector 283, the controller 290 may capture the third display screen 1030 which is located in a higher area from among the first display area 1010 and the third display area 1030 as illustrated in FIG. 10C, according to an exemplary embodiment.

That is, the controller 290 may capture a screen displayed in a display area from among a plurality of display areas according to a bending form of the display 230.

Figure 11A:
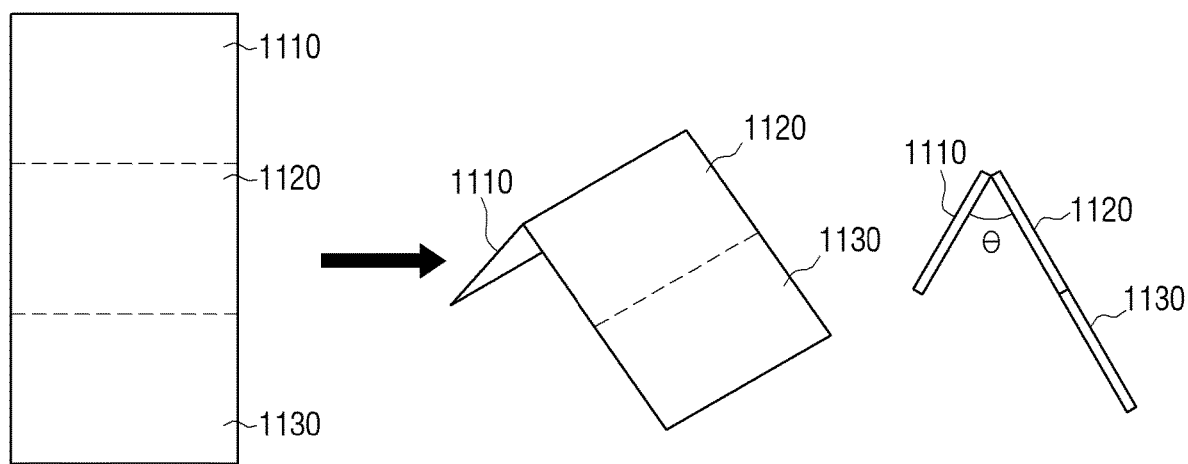

In addition, as illustrated in FIG. 11A, in response to a first display area 1110 being detected as being bent in the direction of the rear side of the display 230 at an angle within a predetermined angle range (θ) (for example, 60 degrees to 120 degrees) with reference to the first hinge, the controller 290 may control the display 230 to display a first image in the first display area 1110 and display a second image in a second display area 1120 and a third display area 1130, according to an exemplary embodiment. In this case, one of the first image and the second image may be an image for a user of the user terminal device 200, and the other image from among the first image and the second image may be an image for another user located on an opposite side of the user using the user terminal device 200.

Figure 11B:
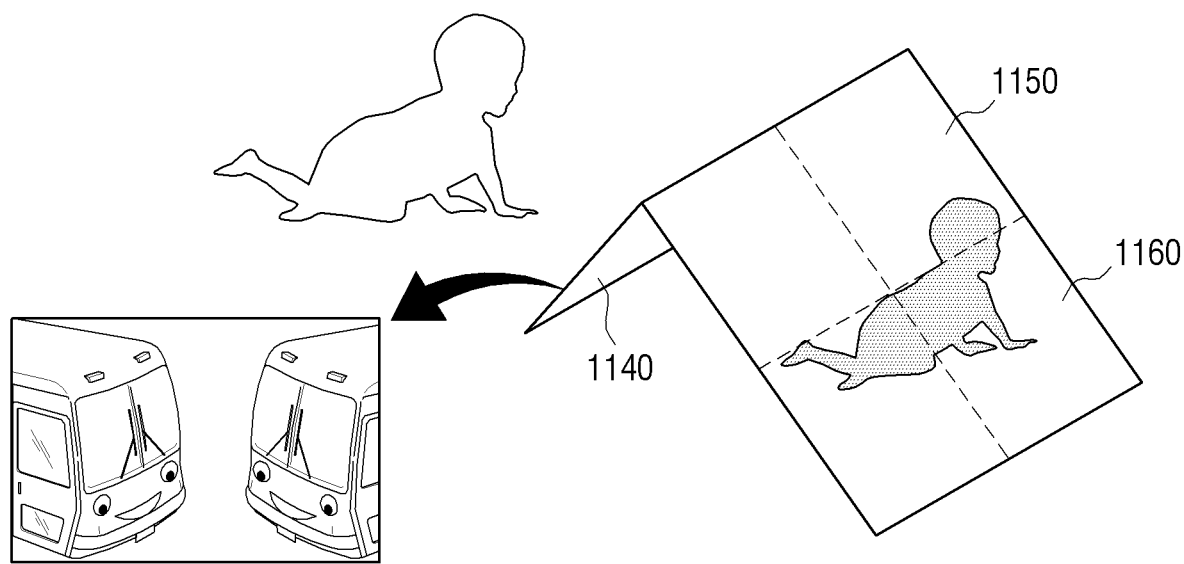

For example, in response to the first display area 1110 being detected as being bent in the direction of the rear side of the display 230 at an angle within a predetermined angle range (for example, 60 degrees to 120 degrees) with reference to the first hinge while a camera application is executed, as illustrated in FIG. 11B, the controller 290 may control the display 230 to display an image content that a subject to be photographed may watch in the first display area 1110 and display a live view image as seen from the camera in the second display area 1120 and the third display area 1130. Accordingly, a user is able to execute a photographing function while the subject to be photographed watches an image content, according to an exemplary embodiment.

Figure 12A:
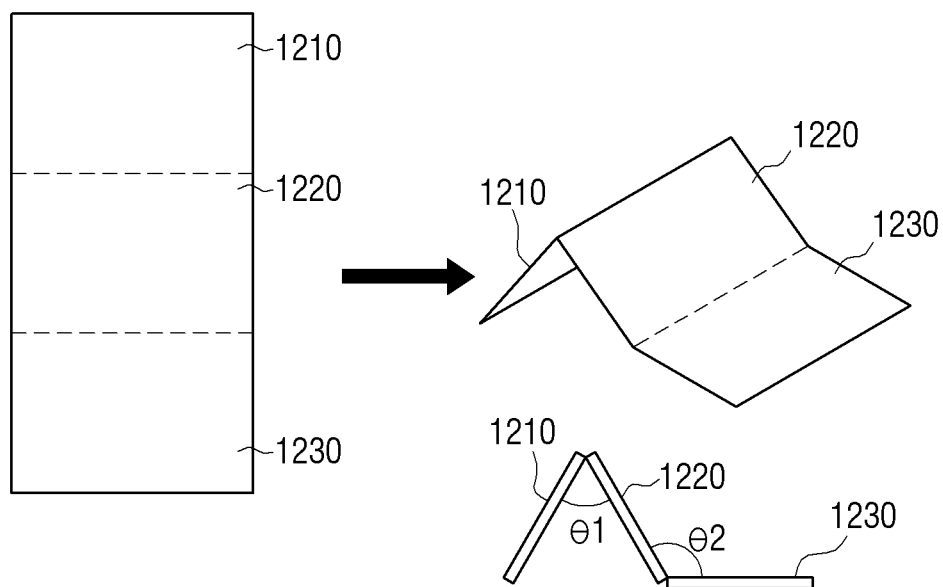

According to another exemplary embodiment, as illustrated in FIG. 12A, in response to a first display area 1210 being detected as being bent in the direction of the rear side of the display 230 at an angle within a first predetermined angle range (θ1) (for example, 60 degrees to 120 degrees), with reference to a first hinge, and a third display area 1230 being detected as being bent in the direction of the front side of the display 230 at an angle within a second predetermined angle range (θ2) (for example, 30 degrees to 60 degrees) with reference to a second hinge, the controller 290 may control the display 230 to display a first screen in the first display area 1210, display a second screen in a second display area 1220, and display a third screen in a third display area 1230. In this case, the third screen may be a screen for the user of the user terminal device 200, the second screen may be a screen that the user of the user terminal device 200 and another user in the opposite side of the user terminal device 200 share, and the first screen may be a screen for the other user located in the opposite side of the user terminal device 200.

Figure 12B:
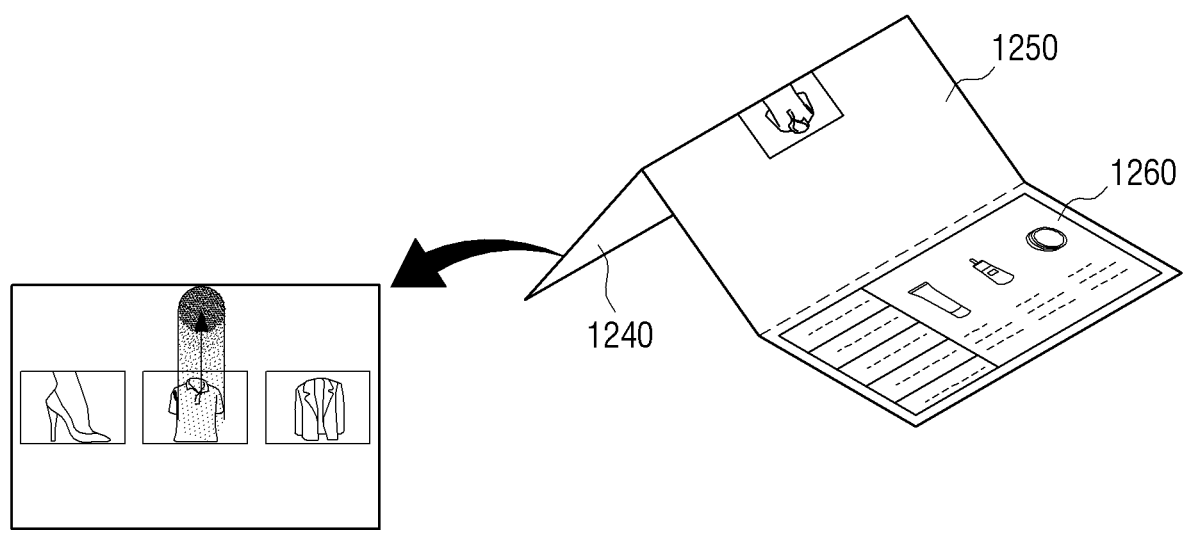

For example, as illustrated in FIG. 12B, in response to the first display area 1240 being detected as being bent in the direction of the rear side of the display 230 at an angle within the first predetermined angle range with reference to the first hinge and in response to the third display area 1260 being detected as being bent in the direction of the front side of the display 230 at an angle within the second predetermined angle range while a shopping application is executed, the controller 290 may control the display 230 to display a shopping item that other user, sitting opposite to a user of the terminal device, searches in the first display area 1240, display a shopping item that a user wishes to share in a second display area 1250, and display a shopping item that the user searches in a third display area 1260.

As described above, by displaying different images in a plurality of display screens when the display 230 is in an unfolded state, with different screens bent at predetermined angles, it is possible to enable a plurality of users to simultaneously use the one user terminal device 200.

Figure 13:
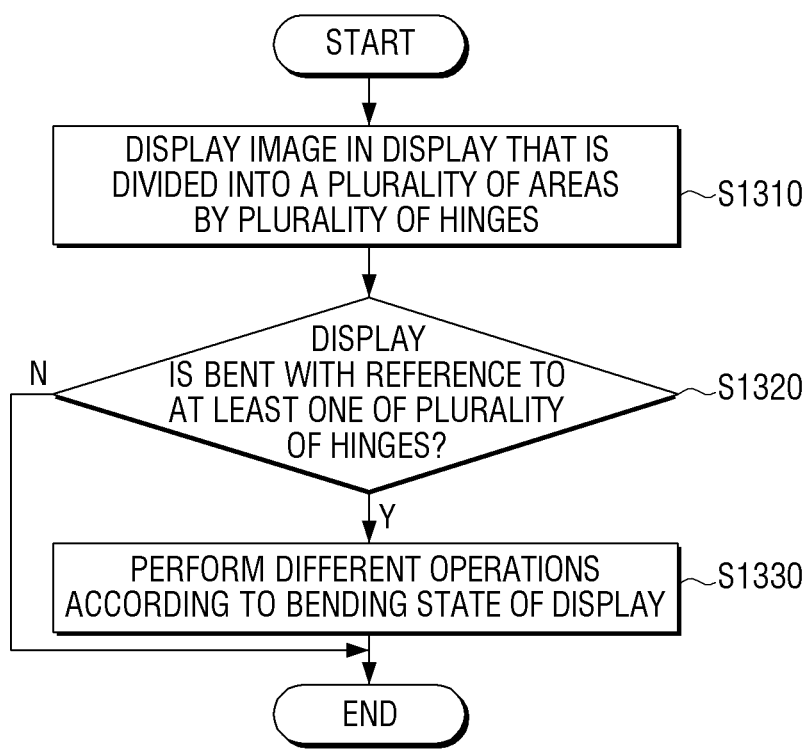

Hereinafter, a displaying method of the user terminal device 200 will be described with reference to FIG. 13.

First, the user terminal device 200 displays an image in the display 230 that is divided into a plurality of areas by the plurality of hinges 235 (S1310).

Then, the user terminal device 200 determines whether the display 230 is bent with reference to at least one of the plurality of hinges 235 (S1320).

In response to determining that the display 230 is bent with reference to at least one of the plurality of hinges 235 (S1320-Y), the user terminal device 200 performs different operations according to a bending state of the display 230 (S1330). To be specific, the user terminal device 200 may perform various operations according to a bending state of the display 230 as described in connection with FIGS. 5A to 12B.

By the above described displaying method, it is possible to provide a user with various user experiences through the user terminal device 200, including the display 230 which may be bent with reference to the plurality of hinges 235.

Meanwhile, in the above exemplary embodiments, a surface of the user terminal device 200 consists of the display 230, and the other surface consists of covers 331, 333 and 335 and hinges 341 and 343, but this is merely an example. That is, both surfaces of the user terminal device 200 may be realized as flexible displays. In this case, the hinge may be disposed inside the flexible display or between the flexible displays.

Meanwhile, if both surfaces of the user terminal device are realized as displays, as illustrated in FIG. 14A, a front display may consist of a first display area 1411, a second display area 1412, and a third display area 1413 with reference to a first folding line 1421 and a second folding line 1423, and a rear display may consist of a fourth display area 1414, a fifth display area 1415, and a sixth display area 1416 with reference to the first folding line 1421 and the second folding line 1423, according to an exemplary embodiment.

In addition, in response to one of a plurality of display areas being bent in a front direction with reference to a folding line, an image displayed in a covered area may be displayed in a display area in a rear side, according to an exemplary embodiment. This operation will be described below with reference to FIGS. 14B to 14G.

Figure 14B:
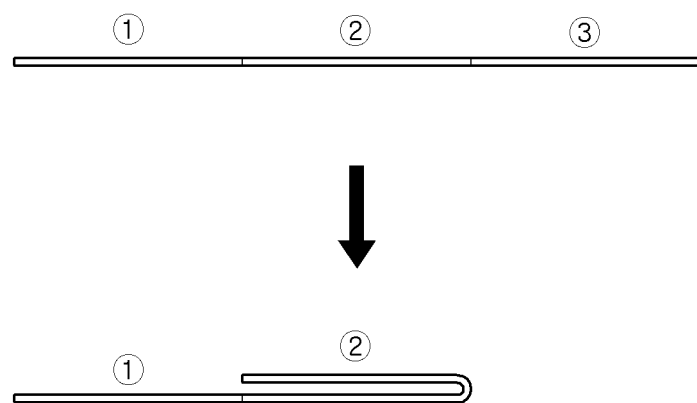

Specially, as illustrated in FIG. 14B, in response to a bending interaction of bending the third display area 1413 in the direction of the front side of the display 230 with reference to the second folding line 1423 being detected while a first image, a second image, and a third image are respectively displayed in each of the first display area 1411, the second display area 1412, and the third display area 1413, the controller 290 may control the display 230 to display the first image in the first display area 1411 and display the second image in the sixth display area 1416, according to an exemplary embodiment. Accordingly, the second image which has been displayed in the second display area 1412 is displayed in the sixth display area 1416 even if a bending interaction is detected, and thus, a user is able to have a user experience as though the second image is continuously displayed in the same location.

According to another exemplary embodiment, as illustrated in FIG. 14C, in response to a bending interaction of bending the third display area 1413 in the direction of the rear side of the display 230 with reference to the second folding line 1423 being detected while the first image, the second image, and the third image are respectively displayed in each of the first display area 1411, the second display area 1412, and the third display area 1413, the controller 290 may control the display 230 to display the first image in the first display area 1411 and display the second image in the second display area 1412, according to an exemplary embodiment.

Figure 14D:
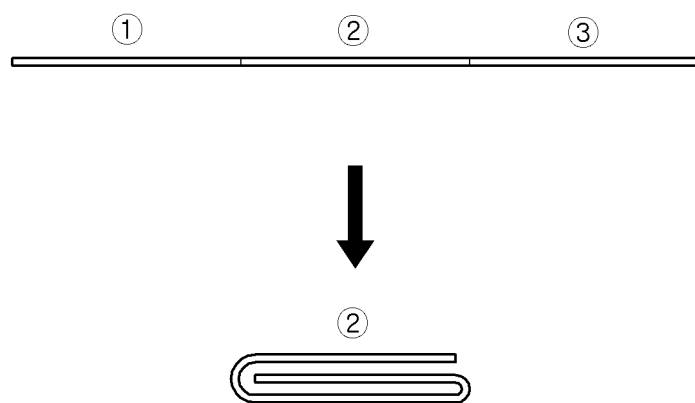

According to another exemplary embodiment, as illustrated in FIG. 14D, in response to a bending interaction of bending the third display area 1413 in the direction of the front side of the display 230 with reference to the second folding line 1423 and a bending interaction of bending the first display area 1411 in the direction of the front side of the display 230 with reference to the first folding line 1421, being detected while the first image, the second image, and the third image are respectively displayed in each of the first display area 1411, the second display area 1413, and the third display area 1415, the controller 290 may control the display 230 to display the second image in the fourth display area 1414. Accordingly, the second image which has been displayed in the second display area 1412 is displayed in the fourth display area 1414 even if a bending interaction is detected, and thus, the user is able to have a user experience as though the second image is continuously displayed in the same location.

Figure 14E:
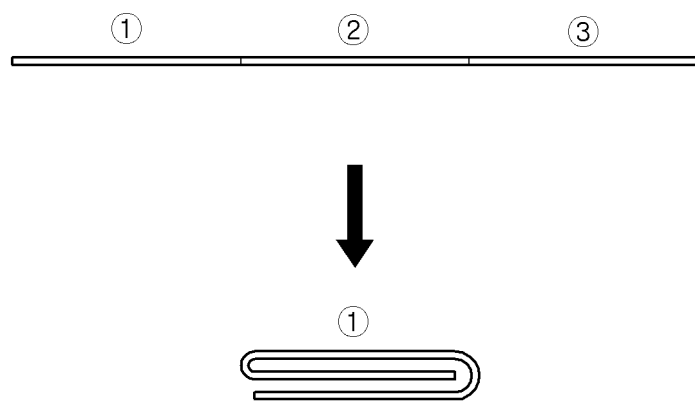

According to another exemplary embodiment, as illustrated in FIG. 14E, in response to a bending interaction of bending the second display area 1412 and the third display area 1413 in the direction of the front side of the display 230 with reference to the first folding line 1421 and bending the third display area 1413 in the direction of the front side of the display 230 with reference to the second folding line 1423 being detected while the first image, the second image, and the third image are respectively displayed in each of the first display area 1411, the second display area 1412, and the third display area 1413, the controller 290 may control the display 230 to display the first image in the fifth display area 1415. Accordingly, the first image which has been displayed in the first display area 1411 is displayed in the fifth display area 1415 even if a bending interaction is detected, and thus, the user is able to have a user experience as though the first image is continuously displayed in the same location.

Figure 14F:
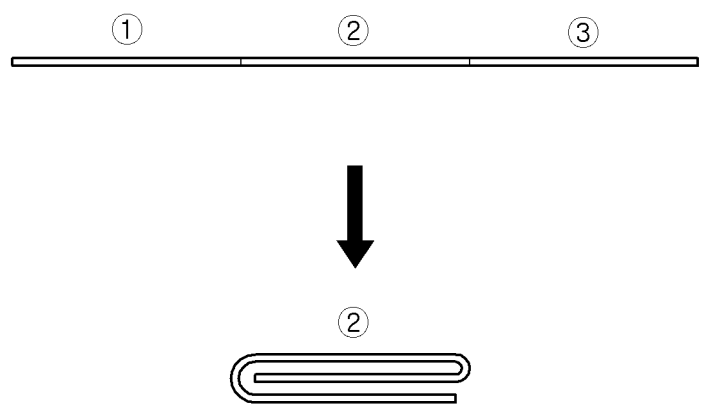

According to another exemplary embodiment, as illustrated in FIG. 14F, in response to a bending interaction of bending the first display area 1411 in the direction of the rear side of the display 230 with reference to the first folding line 1421 and bending the third display area 1413 in the direction of the rear side of the display 230 with reference to the second folding line 1423 being detected while the first image, the second image, and the third image are respectively displayed in each of the first display area 1411, the second display area 1412, and the third display area 1413, the controller 290 may control the display 230 to continuously display the second image in the second display area 1412.

Figure 14G:
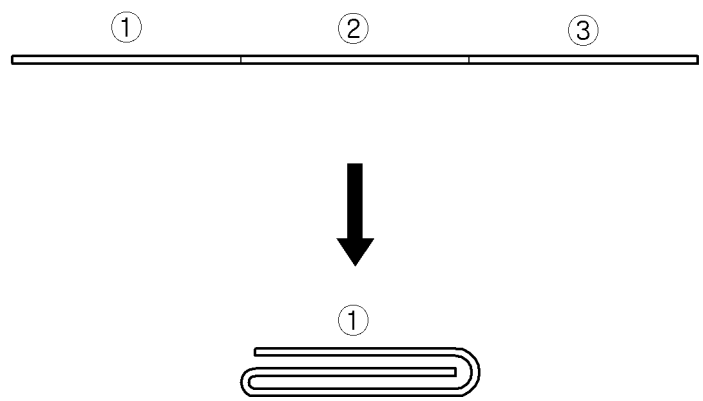

According to another exemplary embodiment, as illustrated in FIG. 14G, in response to a bending interaction of bending the third display area 1413 in the direction of the rear side of the display 230 with reference to the second folding line 1423 and bending the second display area 1412 in the direction of the rear side of the display 230 with reference to the first folding line 1421 being detected while the first image, the second image, and the third image are respectively displayed in each of the first display area 1411, the second display area 1412, and the third display area 1413, the controller 290 may control the display 230 to display the first image in the first display area 1411.

Extension of Functions and Contents According to an Unfolding Operation of the Display 230

The display 230 may be divided into the first display area and the second display area with reference to the first folding line corresponding to the first hinge and may be divided into the second display area and the third display area with reference to the second folding line corresponding to the second hinge. Alternatively, the display 230 may be divided into the first display area and the second display area with reference to the first folding line corresponding to the first hinge and may be divided into the first display area and the third display area with reference to the second folding line corresponding to the second hinge. The display 230 may be folded or unfolded with reference to the first folding line or the second folding line.

For example, the first display area and the second display area may be unfolded with reference to the first folding line. This case may include a case where the first display area and the second display area are located on the same plane or the first display area and the second display simultaneously visible to a user at the same time. In response to a bending interaction of unfolding the first display area and the second display area at an angle within a predetermined angle range (for example, 160 degrees to 200 degrees), being detected through the bending detector 283, while the display 230 is folded with reference to the first folding line, the controller 290 may determine that the first display area and the second display area are unfolded with reference to the first folding line.

Figure 15:
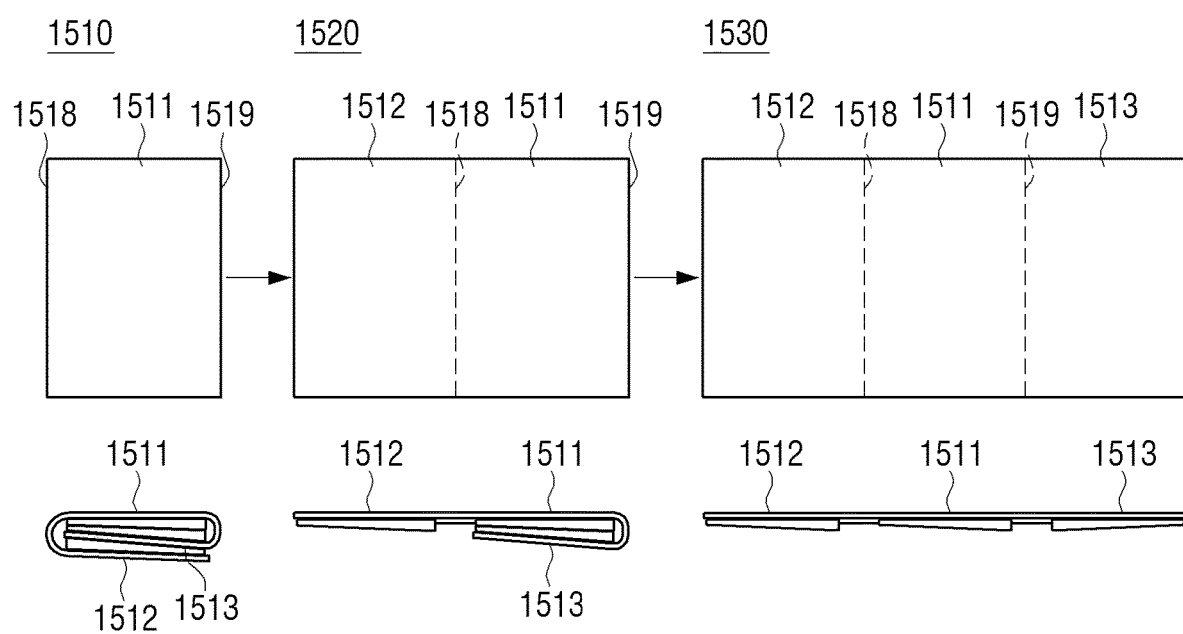
Figure 16:
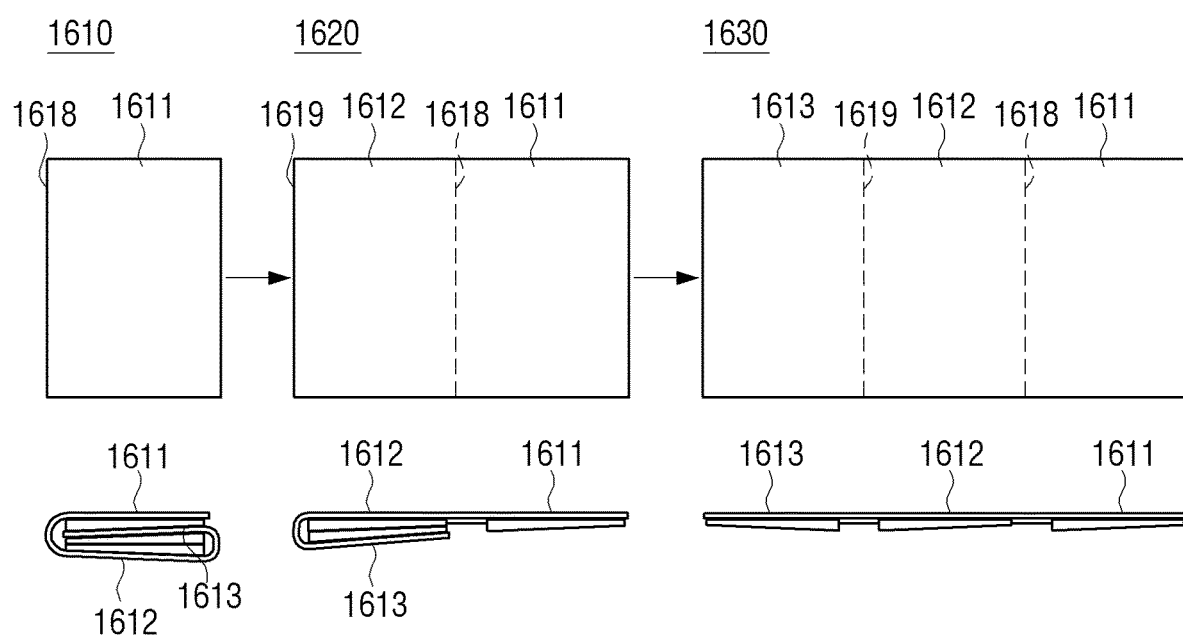
Figure 17:
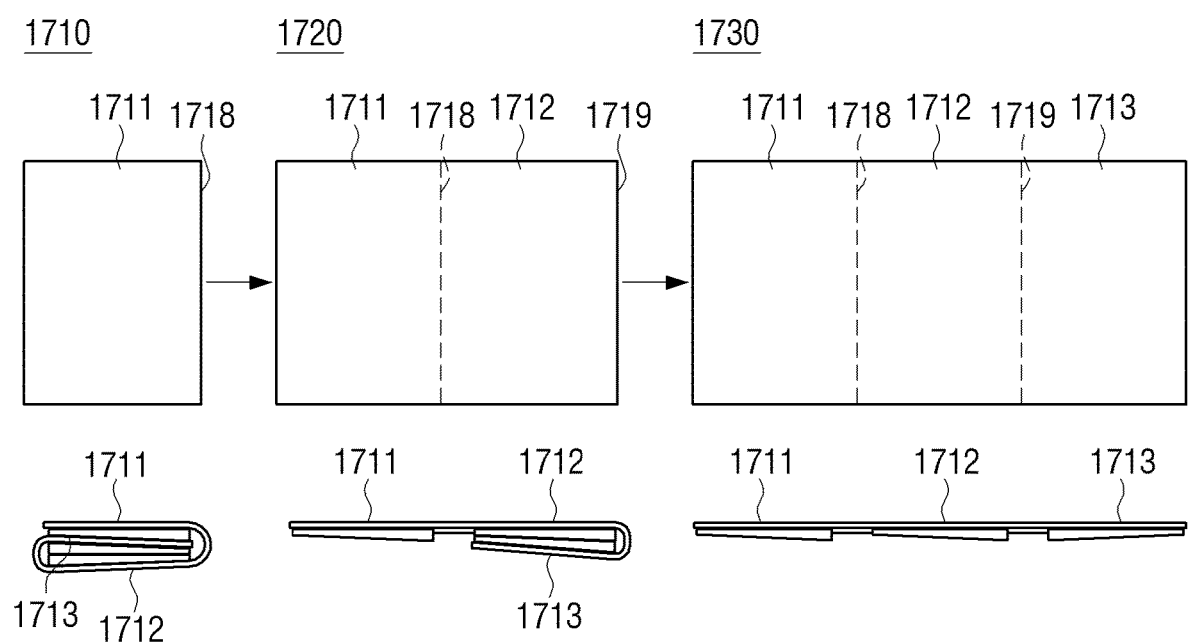

FIGS. 15 to 17 depict views illustrating an exemplary embodiment in which the display 230 is unfolded with reference to a plurality of folding lines.

According to an exemplary embodiment, as illustrated in 1510 of FIG. 15, the display 230 may be bent so that a first display area 1511 is exposed to the user. In this case, a second display area 1512 may be in a state in which the second display area 1512 is folded in a direction of a rear side of the first display area 1511 with reference to a first folding line 1518, and a third display area 1513 may be in a state in which the third display area 1513 is folded in the direction of the rear side of the first display area 1511 with reference to a second folding line 1519. Subsequently, in response to the second display area 1512 being unfolded in a direction of a front side of the first display area 1511 with reference to the first folding line 1518, as illustrated in 1520 of FIG. 15, the display 230 may be bent so that the first display area 1511 and the second display area 1512 are exposed to the user. In this case, the third display area 1513 may be in a state in which the third display area 1513 is folded in the direction of the rear side of the first display area 1511 with reference to the second folding line 1519. Subsequently, in response to the third display area 1513 being unfolded in the direction of the front side of the first display area 1511 with reference to the second folding line 1519, as illustrated in 1530 of FIG. 15, all of the first display area 1511, the second display area 1512, and the third display area 1513 may be exposed to the user.

According to another exemplary embodiment, as illustrated in 1610 of FIG. 16, the display 230 may be bent so that a first display area 1611 is exposed to the user. In this case, a second display area 1612 may be in a state in which the second display area 1612 is folded in a direction of a rear side of the first display area 1611 with reference to a first folding line 1618, and a third display area 1613 may be in a state in which the third display area 1613 is folded in a direction of a rear side of the second display area 1612 with reference to a second folding line 1619. Subsequently, in response to the second display area 1612 being unfolded in a direction of a front side of the first display area 1611 with reference to the first folding line 1618, as illustrated in 1620 of FIG. 16, the display 230 may be bent so that the first display area 1611 and the second display area 1612 are exposed to the user. In this case, the third display area 1613 may be in a state in which the third display area 1613 is folded in the direction of the rear side of the second display area 1612 with reference to the second folding line 1619. Subsequently, in response to the third display area 1613 being unfolded in the direction of the front side of the second display area 1612 with reference to the second folding line 1619, as illustrated in 1630 of FIG. 16, all of the first display area 1611, the second display area 1612, and the third display area 1613 may be exposed to the user.

According to another exemplary embodiment, as illustrated in 1710 of FIG. 17, the display 230 may be bent so that a first display area 1711 is exposed to the user. In this case, a second display area 1712 may be in a state in which the second display area 1712 is folded in a direction of a rear side of the first display area 1711 with reference to a first folding line 1718, and a third display area 1713 may be in a state in which the third display area 1713 is folded in a direction of a rear side of the second display area 1712 with reference to a second folding line 1719. Subsequently, in response to the second display area 1712 being unfolded in a direction of a front side of the first display area 1711 with reference to the first folding line 1718, as illustrated in 1720 of FIG. 17, the display 230 may be bent so that the first display area 1711 and the second display area 1712 are exposed to the user. In this case, the third display area 1713 may be in a state in which the third display area 1713 is folded in the direction of the rear side of the second display area 1712 with reference to the second folding line 1719. Subsequently, in response to the third display area 1713 being unfolded in the direction of the front side of the second display area 1712 with reference to the second folding line 1719, as illustrated in 1730 of FIG. 17, all of the first display area 1711, the second display area 1712, and the third display area 1713 may be exposed to the user.

As described above, in response to the display 230 gradually being unfolded with reference to a plurality of hinges, the controller 290 may control the display 230 so that functions of an application are extended as a display area that is exposed to the user becomes enlarged, and thus, the extended functions are provided through the display area exposed to the user. Specifically, in response to a first bending interaction of unfolding the display 230 with reference to a first folding line being detected through the bending detector 283 while an execution screen of an application which provides a first function is displayed in a first display area, the controller 290 may control the display 230 to display an execution screen of an application which provides the first function and a second function in the first display area and a second display area. In addition, in response to a second bending interaction of unfolding the display 230 with reference to a second folding line being detected through the bending detector 283 while the execution screen of the application which provides the first function and the second function is displayed in the first display area and the second display area, the controller 290 may control the display 230 to display an execution screen of an application which provides the first function, the second function, and a third function in the first display area, the second display area, and a third display area.

In this case, the first to third functions may control the same information. For example, the first to third functions may control the same contents. Alternatively, the first to third functions may have the same purpose. For example, the first to third functions may have the same purpose of controlling a telephone call with other party, according to an exemplary embodiment.

In this case, the application which provides the first function, the application which provides the second function, and the application which provides the third function may be the same application or may be different applications. According to an unfolded state of the display 230, the controller 290 may select a mode from among a plurality of modes for displaying at least one application. For example, in response to only the first display area being exposed to the user, the controller 290 may control the display 230 to apply a layout and a user interface corresponding to an application to the first display area and display the application in a first mode among the plurality of modes. In addition, in response to the first display area and the second display area being exposed to the user, the controller 290 may control the display 230 to apply layouts and user interfaces corresponding to an application to the first display area and the second display area and display the application in a second mode among the plurality of modes. In addition, in response to the first to third display areas being exposed to the user, the controller 290 may control the display 230 to apply layouts and user interfaces corresponding to an application to the first to third display areas and display the application in a third mode among the plurality of modes.

In addition, as described above, in response to the display 230 gradually being unfolded with reference to the plurality of hinges, the controller 290 may control the display 230 so that an amount of information on an image content increases as a display area that is exposed to the user becomes enlarged, and thus, the information is displayed through the display area exposed to the user. Specially, in response to a first bending interaction of unfolding the display 230 with reference to a first folding line being detected through the bending detector 283 while a first image content is displayed in a first display area, the controller 290 may control the display 230 to display a second image content related to the first image content in the first display area and a second display area. In addition, in response to a second bending interaction of unfolding the display 230 with reference to a second folding line being detected through the bending detector 283 while the second image content is displayed in the first display area and the second display area, the controller 290 may control the display 230 to display a third image content related to the second image content in the first display area, the second display area, and a third display area.

In this case, the second image content may include the first image content, and the third image content may include the first image content and the second image content. The first image content may be continuously displayed in the first display area. In other words, a location where the first image content is displayed may be fixed as the first display area of the display 230. For example, in response to the second image content including the first image content being displayed in the first display area and the second display area, the controller 290 may control the display 230 to display the first image content in the first display area and display another part of the second image content in the second display area. In addition, in response to the third image content including the first image content and the second image content being displayed in the first to third display areas, the controller 290 may control the display 230 to display the first image content in the first display area and display another part of the third image content in the second display area and the third display area.

Figure 18:
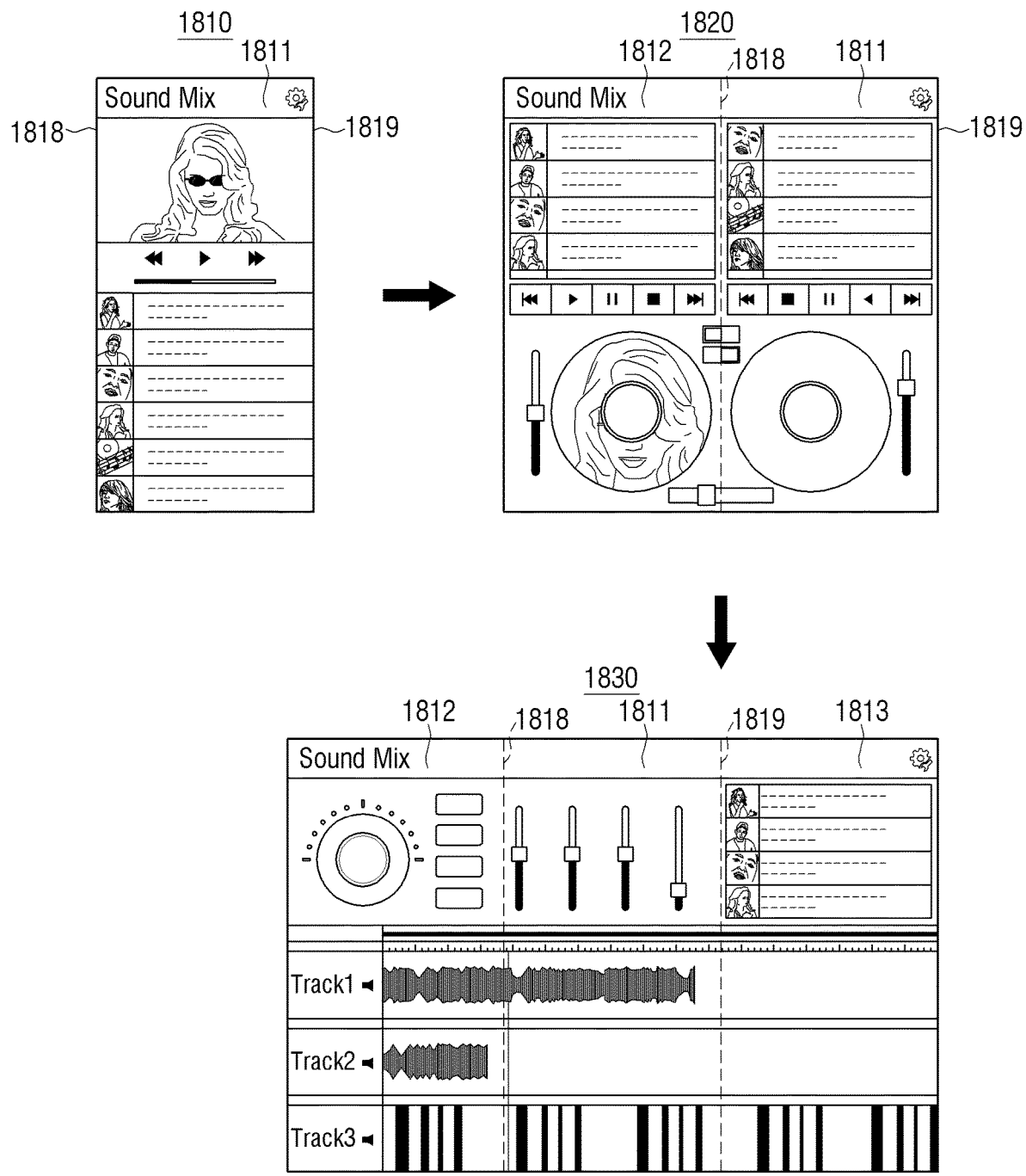

FIG. 18 depicts views illustrating an exemplary embodiment of performing various functions of the user terminal device 200 as the display 230 is unfolded with reference to a plurality of folding lines, according to an exemplary embodiment.

As illustrated in 1810 of FIG. 18, the controller 290 may control the display 230 so that an execution screen of an application which includes a function of controlling an audio content is displayed in a first display area 1811. For example, the function of controlling an audio content may include a function of playing back or stopping a certain music item, a function of playing back a next music item or a previous music item in an album including a certain music item, a function of playing back a certain music item fast or slowly, and the like. In this case, the bending detector 283 may detect a first bending interaction of unfolding the display 230 with reference to a first folding line 1818.

In response to the first bending interaction being detected through the bending detector 283, as illustrated in 1820 of FIG. 18, the controller 290 may control the display 230 so that an execution screen of an application which includes the function of controlling an audio content and a function of mixing a plurality of audio contents is displayed in a first display area 1811 and a second display area 1812. For example, the function of mixing a plurality of audio contents may include a function of controlling to mix at least a part of a plurality of music items, and the like. Furthermore, the bending detector 283 may detect a second bending interaction of unfolding the display 230 with reference to a second folding line 1819.

In response to the second bending interaction being detected through the bending detector 283, as illustrated in 1830 of FIG. 18, the controller 290 may control the display 230 so that an execution screen of an application which includes the function of controlling an audio content, the function of mixing a plurality of audio contents, and a function of editing at least one or more audio contents is displayed in a first display area 1811, the second display area 1812, and a third display area 1813. For example, the function of editing at least one or more audio contents may include a function of deleting a certain section of an audio content, a function of controlling a volume, a function of providing an equalizer effect, and the like, according to an exemplary embodiment.

According to another exemplary embodiment, in response to the first bending interaction being detected, the controller 290 may control the display 230 to display the execution screen of the application which provides the function of editing at least one or more audio contents, and in response to the second bending interaction being detected, to display the execution screen of the application which provides the function of editing at least one or more audio contents and the function of mixing a plurality of audio contents.

Figure 19:
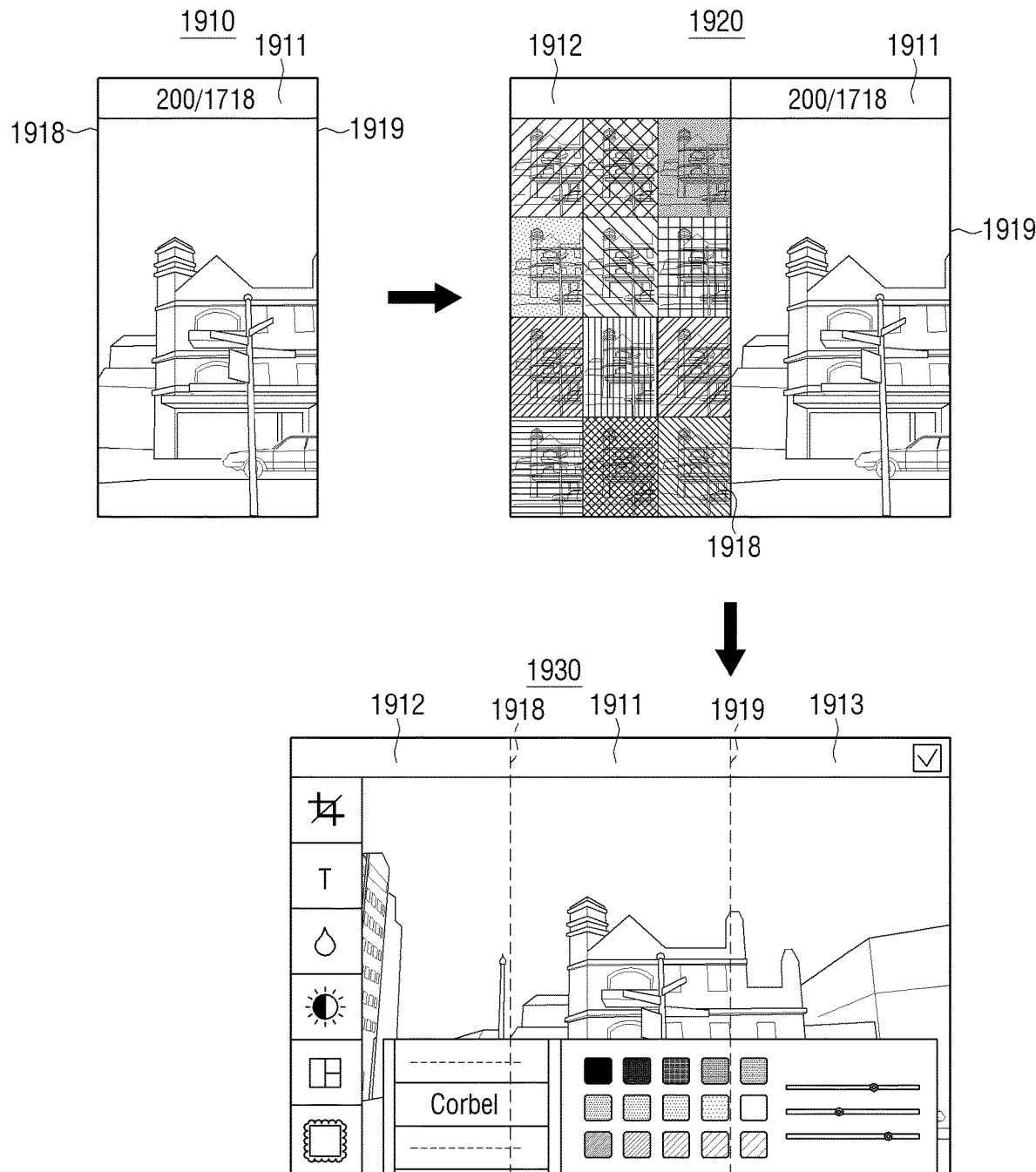

FIG. 19 depicts views illustrating an exemplary embodiment of performing various functions of the user terminal device 200 as the display 230 is unfolded with reference to a plurality of folding lines, according to another exemplary embodiment.

As illustrated in 1910 of FIG. 19, the controller 290 may control the display 230 to display an execution screen of an application which includes a function of displaying an image content in a first display area 1911. In this case, the bending detector 283 may detect a first bending interaction of unfolding the display 230 with reference to a first folding line 1918.

In response to the first bending interaction being detected through the bending detector 283, as illustrated in 1920 of FIG. 19, the controller 290 may control the display 230 to display an image content in a certain area out of the first display area 1911 and a second display area 1912 and to display an execution screen of an application which provides a function of providing a thumbnail list of image contents to which different filtering effects are applied in the other area, according to an exemplary embodiment. In response to a certain image content being selected by a user from the thumbnail list of the image contents, the certain area may display an image content to which a filtering effect selected by the user is applied. Furthermore, the bending detector 283 may detect a second bending interaction of unfolding the display 230 with reference to a second folding line 1919.

In response to the second bending interaction being detected through the bending detector 283, as illustrated in 1930 of FIG. 19, the controller 290 may control the display 230 to display an execution screen of an application which includes the function of displaying an image content, a function of applying a filtering effect to an image content, and a function of editing an image content in the first to third display areas 1911, 1912, 1913. The function of editing an image content may include a function of copying, deleting, or changing a part of an image content, a function of inserting a text into an image content, a function of changing a layout of an image content, a function of changing contrast or brightness of an image content, and the like, according to an exemplary embodiment.

Figure 20:
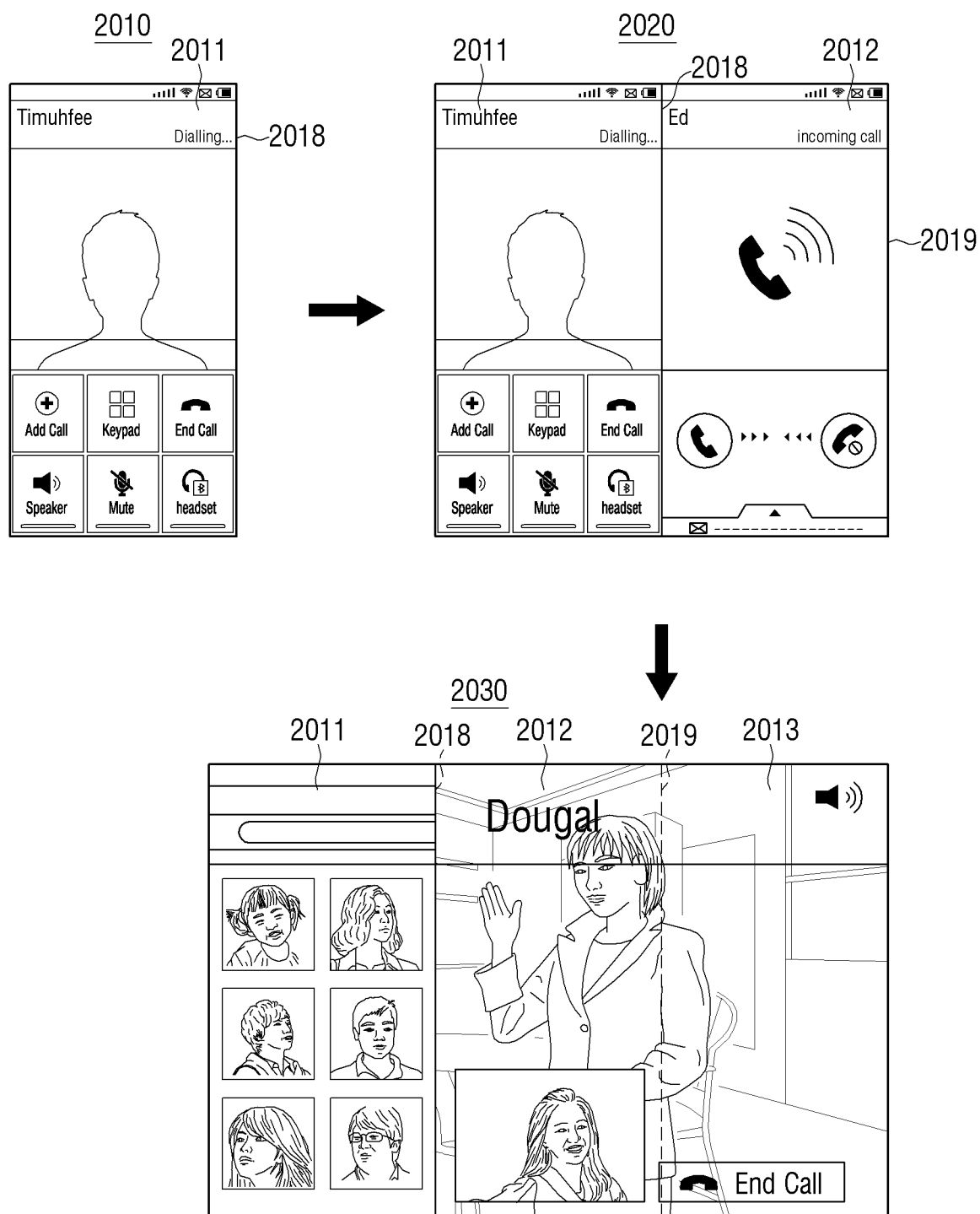

FIG. 20 depicts views illustrating an exemplary embodiment of performing various functions of the user terminal device 200 as the display 230 is unfolded with reference to a plurality of folding lines, according to another exemplary embodiment.

As illustrated in 2010 of FIG. 20, the controller 290 may control the display 230 to display an execution screen of an application which includes a function of performing a telephone call with a first party in a first display area 2011. For example, the function of performing a telephone call with the first party may include a function of accepting a request for a telephone call from the first party, a function of requesting for a telephone call to the first party, and a function of performing a telephone call with the first party. In this case, the bending detector 283 may detect a first bending interaction of unfolding the display 230 with reference to a first folding line 2018.

In response to the first bending interaction being detected through the bending detector 283, as illustrated in 2020 of FIG. 20, the controller 290 may control the display 230 to display an execution screen of an application which includes a function of simultaneously performing a telephone call with the first party and a second party in the first display area 2011 and a second display area 2012. For example, the function of simultaneously performing a telephone call with the first party and the second party may include a function of accepting a request for a telephone call from the second party while performing a telephone call with the first party, a function of requesting for a telephone call to the second party while performing a telephone call with the first party, and the like. Furthermore, the bending detector 283 may detect a second bending interaction of unfolding the display 230 with reference to a second folding line 2019.

In response to the second bending interaction being detected through the bending detector 283, as illustrated in 2030 of FIG. 20, the controller 290 may control the display 230 to display an execution screen of an application which includes a function of performing a video call with at least one of the first party and the second party in the first display area 2011, the second display areas 2012, and a third display area 2013. For example, the function of performing a video call with at least one of the first party and the second party may include a function of simultaneously performing a video call with the first party and the second party, a function of simultaneously performing a video call with the first party and the second party including a third party, and the like.

According to another exemplary embodiment, in response to the first bending interaction being detected, the controller 290 may control the display 230 to display an execution screen of an application which includes a function of performing a video call, and in response to the second bending interaction being detected, to display an execution screen of an application which includes a function of simultaneously performing a telephone call with a plurality of parties.

Figure 21:
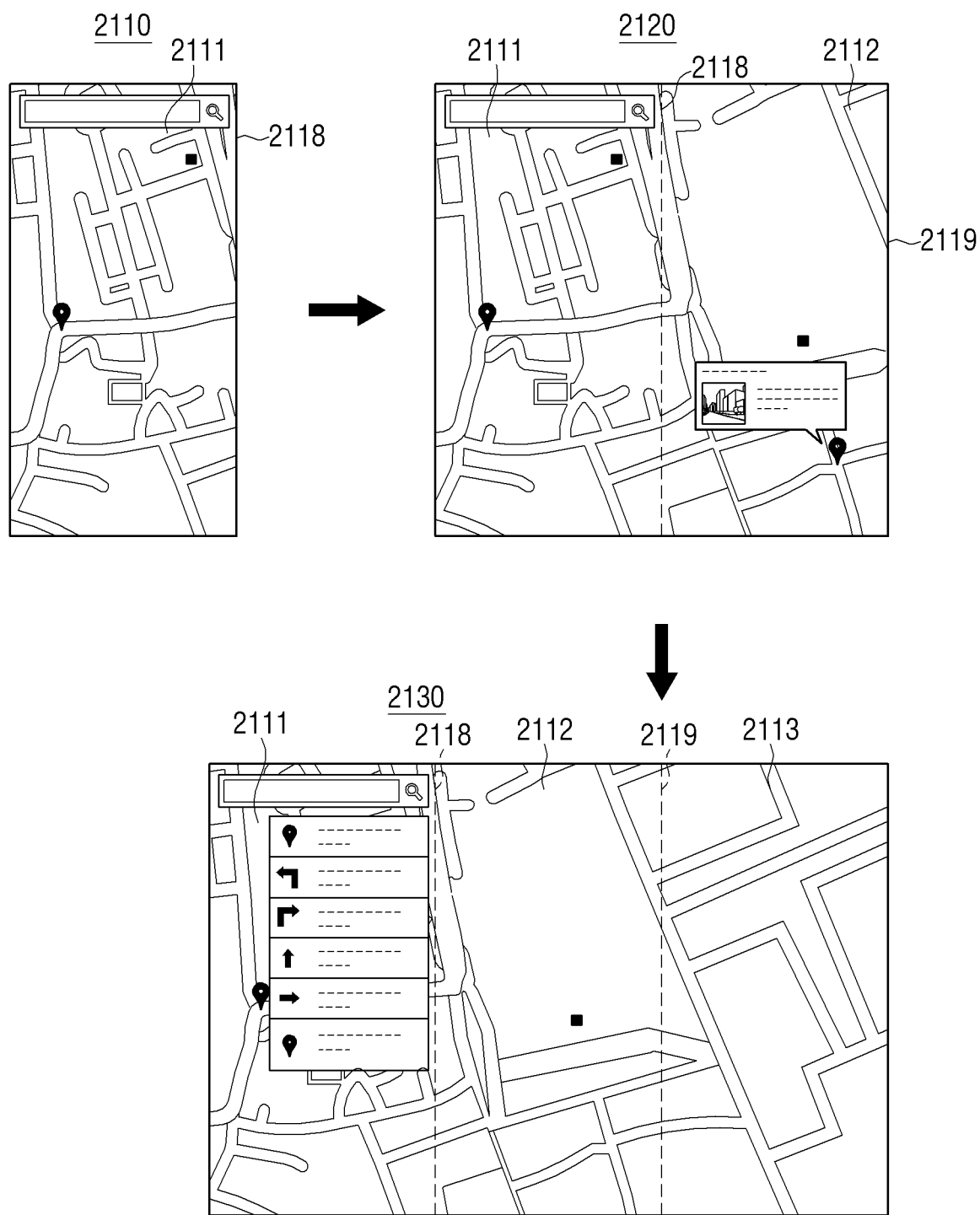

FIG. 21 depicts views illustrating an exemplary embodiment of performing various functions of the user terminal device 200 as the display 230 is unfolded with reference to a plurality of folding lines, according to another exemplary embodiment.

As illustrated in 2110 of FIG. 21, the controller 290 may control the display 230 so that a map application is executed, and a map image is displayed in a first display area 2111. In this case, the bending detector 283 may detect a first bending interaction of unfolding the display 230 with reference to a first folding line 2118.

In response to the first bending interaction being detected through the bending detector 283, as illustrated in 2120 of FIG. 21, the controller 290 may control the display 230 to display the map image and an adjacent map image are displayed in the first display area 2111 and a second display area 2112. In this case, a direction in which the adjacent map image is displayed with reference to the map image may be determined according to a direction in which the display 230 is unfolded with reference to the first display area 2111. For example, in response to the display 230 being unfolded in a right side of the first display area 2111, the adjacent map image may be a map image that is located in an east side of the map image. Furthermore, the bending detector 283 may detect a second bending interaction of unfolding the display 230 with reference to a second folding line 2119.

In response to the second bending interaction being detected through the bending detector 283, as illustrated in 2130 of FIG. 21, the controller 290 may control the display 230 to display the map image, the adjacent map image, and other adjacent map image in the first display area 2111, the second display area 2112, and a third display area 2113. In this case, a direction in which the other adjacent map image is displayed with reference to the adjacent map image may be determined according to a direction in which the display 230 is unfolded with reference to the second display area 2112. For example, in response to the display 230 being unfolded in a right side of the second display area 21121, the other adjacent map image may be a map image that is located in an east side of the adjacent map image.

Figure 22:
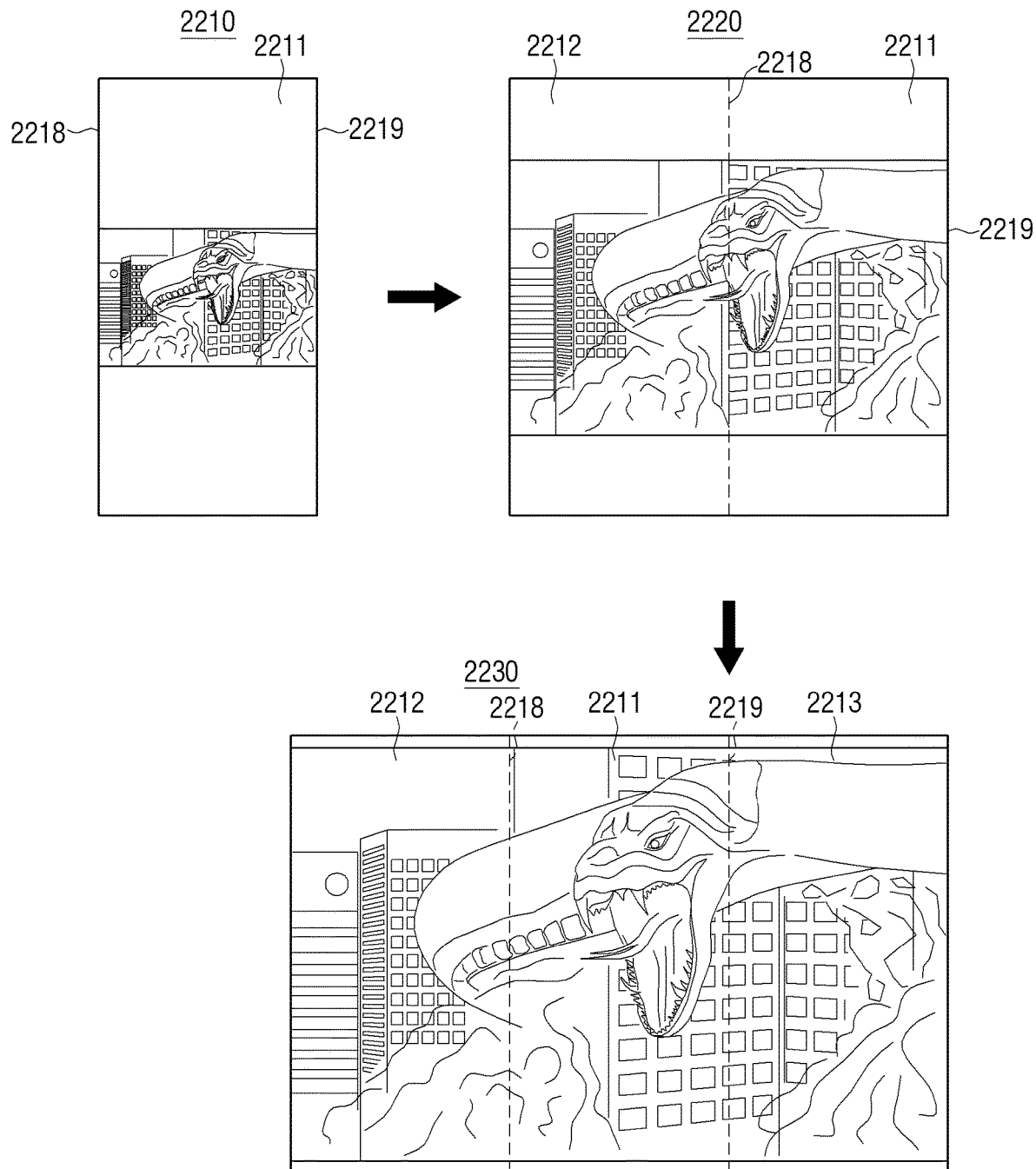

FIG. 22 depicts views illustrating an exemplary embodiment of performing various functions of the user terminal device 200 as the display 230 is unfolded with reference to a plurality of folding lines, according to another exemplary embodiment.

As illustrated in 2210 of FIG. 22, the controller 290 may control the display 230 so that the gallery application is executed and a first image content is displayed in a first display area 2211. In this case, the bending detector 283 may detect a first bending interaction of unfolding the display 230 with reference to a first folding line 2218.

In response to the first bending interaction being detected through the bending detector 283, as illustrated in 2220 of FIG. 22, the controller 290 may control the display 230 so that a second image content, that is the enlarged version of the first image content, is automatically displayed in the first display area 2211 and a second display area 2212. At least one of a length or a width of the second image content may the same or almost the same as at least one of a length or a width of the first and second display areas, according to an exemplary embodiment. In addition, a center of the second image content may correspond to a center of the first and second display areas. Alternatively, the center of the second image content may be located on the first folding line 2218. Furthermore, the bending detector 283 may detect a second bending interaction of unfolding the display 230 with reference to a second folding line 2219.

In response to the second bending interaction being detected through the bending detector 283, as illustrated in 2230 of FIG. 22, the controller 290 may control the display 230 so that a third image content, that is the enlarged version of the second image content, is displayed in the first display area 2211, the second display area 2212, and a third display area 2213. At least one of a length or a width of the third image content may the same or almost the same as at least one of a length or a width of the first to third display areas In addition, a center of the third image content may correspond to a center of the first to third display areas.

Figure 23:
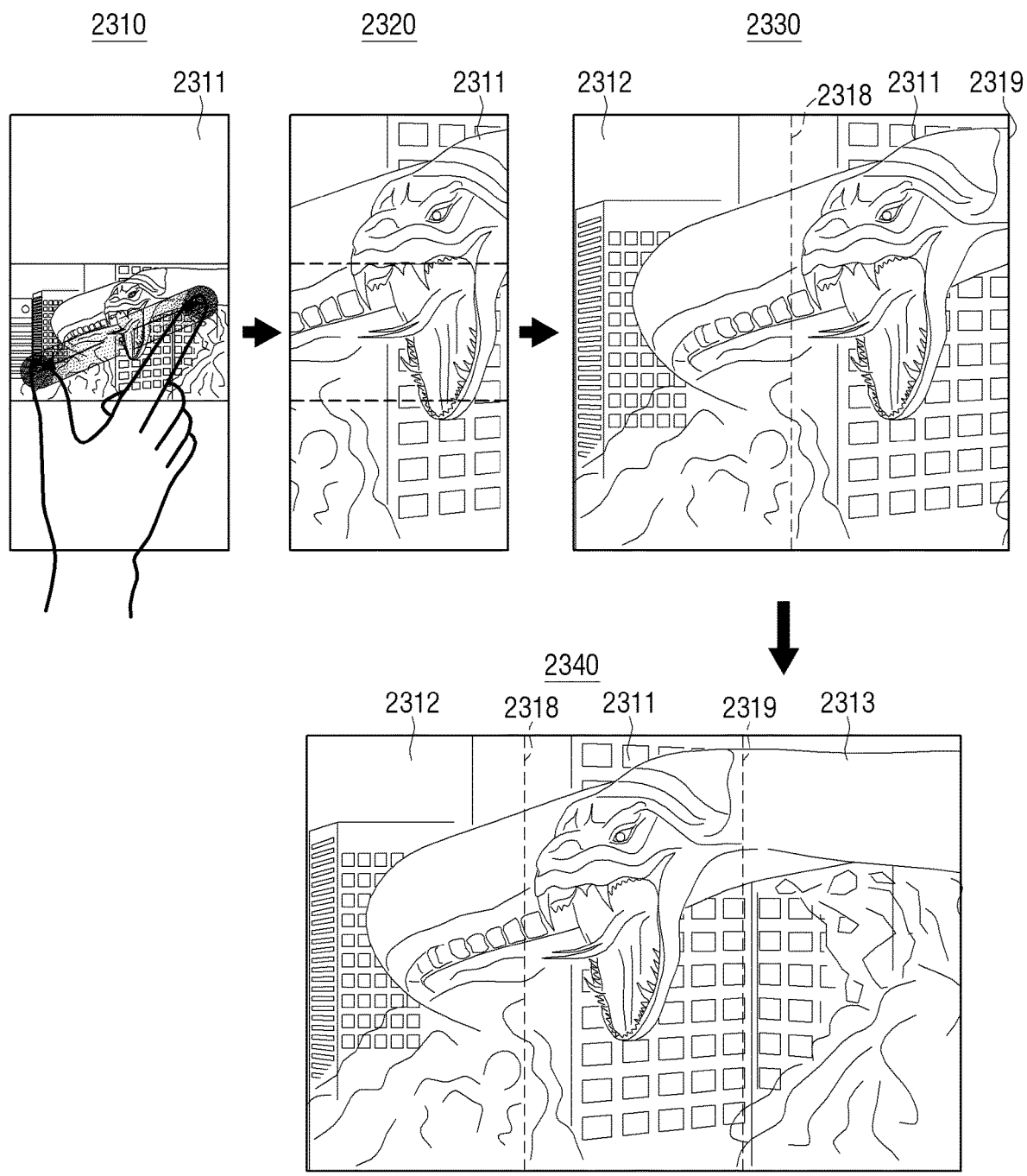

FIG. 23 depicts views illustrating an exemplary embodiment of performing various functions of the user terminal device 200 as the display 230 is unfolded with reference to a plurality of folding lines, according to another exemplary embodiment.

As illustrated in 2310 of FIG. 23, the controller 290 may control the display 230 so that the gallery application is executed and an image content is displayed in a first display area 2311. In this case, the touch detector 281 may detect a user interaction of performing a pinch-out operation on the first display area 2311.

In response to the user interaction being detected through the touch detector 282, as illustrated in 2320 of FIG. 23, the controller 290 may control the display 230 so that a first image content including a part of the enlarged image content is displayed in the first display area 2311. In this case, the bending detector 283 may detect a first bending interaction of unfolding the display 230 with reference to a first folding line 2318.

In response to the first bending interaction being detected through the bending detector 283, as illustrated in 2330 of FIG. 23, the controller 290 may control the display 230 so that a second image content including the first image content and another part of the enlarged image content is displayed in the first display area 2311 and a second display area 2312. Furthermore, the bending detector 283 may detect a second bending interaction of unfolding the display 230 with reference to a second folding line 2319.

In response to the second bending interaction being detected through the bending detector 283, as illustrated in 2340 of FIG. 23, the controller 290 may control the display 230 so that a third image content including the second image content and another part of the enlarged image content is displayed in the first display area 2311, the second display area 2312, and a third display area 2313. In this case, a location where the first image content is displayed may be fixed as the first display area 2311, and each of the second image content and the third image content may be displayed in the second display area 2312 and the third display area 2313 with reference to the fixed first image content, according to an exemplary embodiment.

Figure 24:
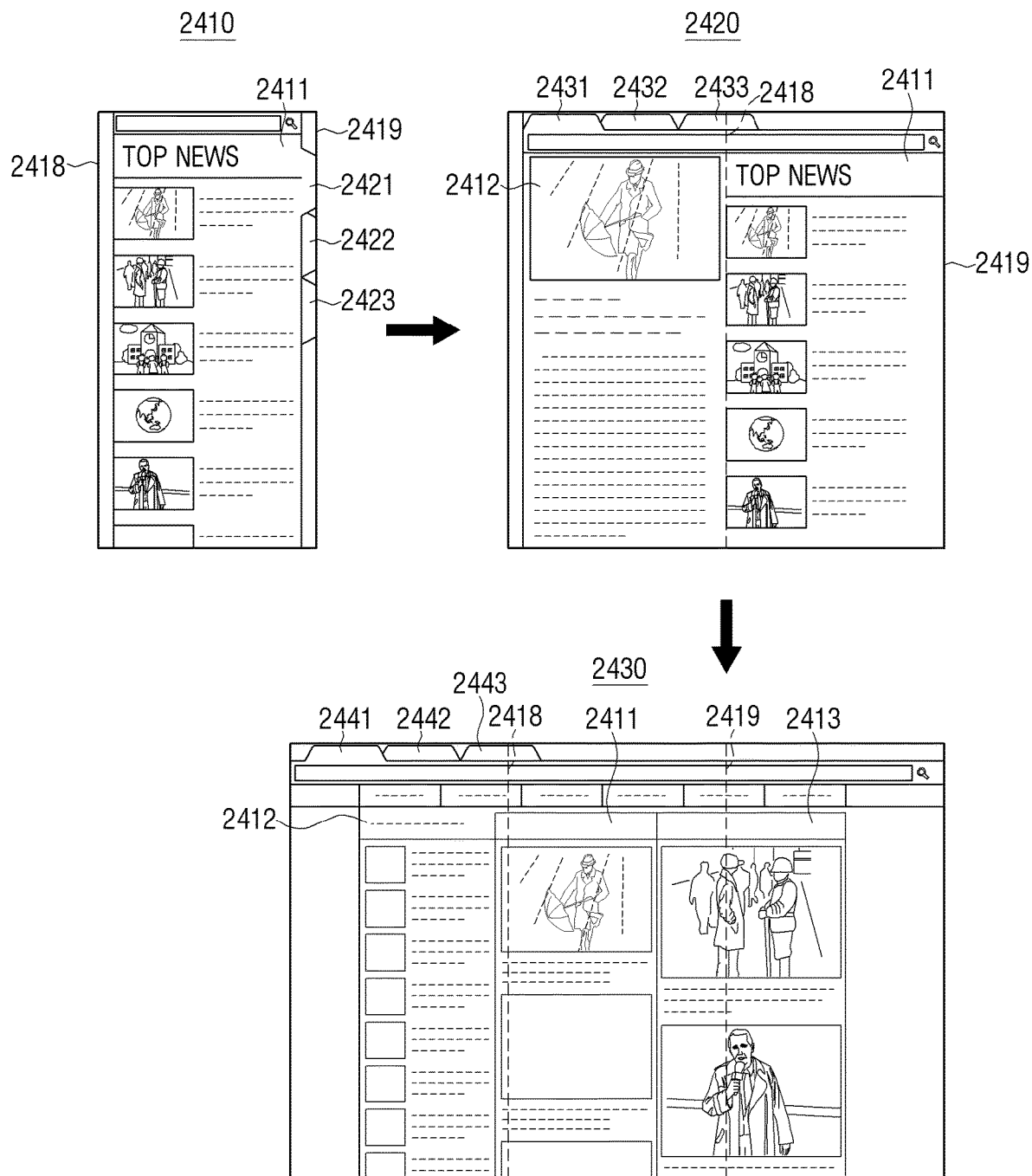

FIG. 24 depicts views illustrating an exemplary embodiment of performing various functions of the user terminal device 200 as the display 230 is unfolded with reference to a plurality of folding lines, according to another exemplary embodiment.

As illustrated in 2420 of FIG. 24, the controller 290 may control the display 230 so that the web application is executed and a web page is displayed in a first display area 1411. In response to a plurality of web pages being provided, a plurality of tabs 2421, 2422, 2423 corresponding to each of the plurality of web pages may be arranged and displayed in a vertical direction in the first display area 2411. In this case, the bending detector 283 may detect a first bending interaction of unfolding the display 230 with reference to a first folding line 2418.

In response to the first bending interaction being detected through the bending detector 283, as illustrated in 2420 of FIG. 24, the controller 290 may control the display 230 so that a web page, of which information amount is increased, is displayed in the first display area 2411 and a second display area 2412. For example, the web page of which information amount is increased may include more texts, images, or moving images than a web page before the information amount increases. In this case, in response to the plurality of web pages being provided, the plurality of tabs 2431, 2432, 2433 corresponding to each of the plurality of web pages may be arranged and displayed in a horizontal direction in at least one of the first display area 2411 and the second display area 2412. Furthermore, the bending detector 283 may detect a second bending interaction of unfolding the display 230 with reference to a second folding line 2419.

In response to the second bending interaction being detected through the bending detector 283, as illustrated in 2430 of FIG. 2430, the controller 290 may control the display 230 so that a web page having more information amount than the web page of which information area is increased is displayed in first display area 2411, the second display area 2412, and a third display area 2413. For example, the web page having more information amount may include more texts, images, or moving images than the web page of which information amount increased. In this case, in response to the plurality of web pages being provided, the plurality of tabs 2431, 2432, 2433 corresponding to each of the plurality of web pages may be arranged and displayed in a horizontal direction in at least one of the first to third display areas 2411, 2412, 2413.

Figure 25:
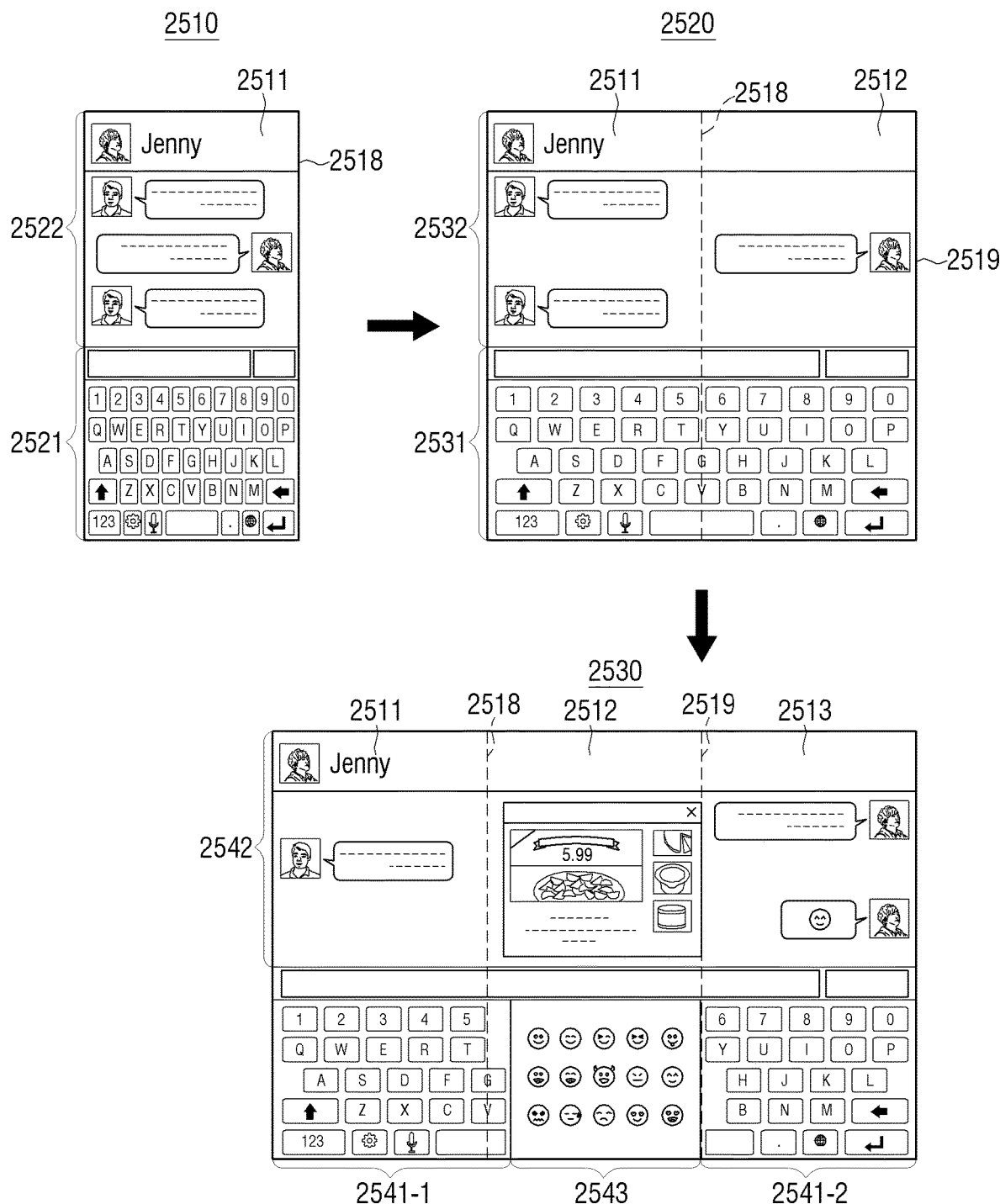

FIG. 25 depicts views illustrating an exemplary embodiment of performing various functions of the user terminal device 200 as the display 230 is unfolded with reference to a plurality of folding lines, according to another exemplary embodiment.

As illustrated in 2510 of FIG. 25, the controller 290 may control the display 230 so that an application where a text input is available (for example, a messenger application or a memo application) is executed and a text input module 2521 and an input text display screen 2522 are displayed in a first display areas 2511. In this case, the bending detector 283 may detect a first bending interaction of unfolding the display 230 with reference to a first folding line 2518.

In response to the first bending interaction being detected through the bending detector 283, as illustrated in 2520 of FIG. 25, the controller 290 may control the display 230 so that the expanded text input module 2531 and the expanded input text display screen 2532 are displayed in the first display area 2511 and a second display area 2512. Furthermore, the bending detector 283 may detect a second bending interaction of unfolding the display 230 with reference to a second folding line 2519.

In response to the second bending interaction being detected through the bending detector 283, as illustrated in 2530 of FIG. 25, the controller 290 may control the display 230 so that expanded text input modules 2541-1, 2542-2, an emoticon input module 2543, and further expanded input text display screen 2542 are displayed in the first display area 2511, the second display area 2512, and a third display area 2513. If the further expanded input text display screen 2542 is a chat window where a user converses with other party, the further expanded input text display screen 2542 may include additional information related to conversation contents. For example, the additional information may be a web page corresponding to an address of a certain website included in the contents of the conversation. Alternatively, the additional information may be an image or a dictionary definition related to a certain word included in the contents of the conversation. In response to an emoticon being selected by a user through the emoticon input module, the selected emoticon may be displayed in the chat window.

Figure 26:
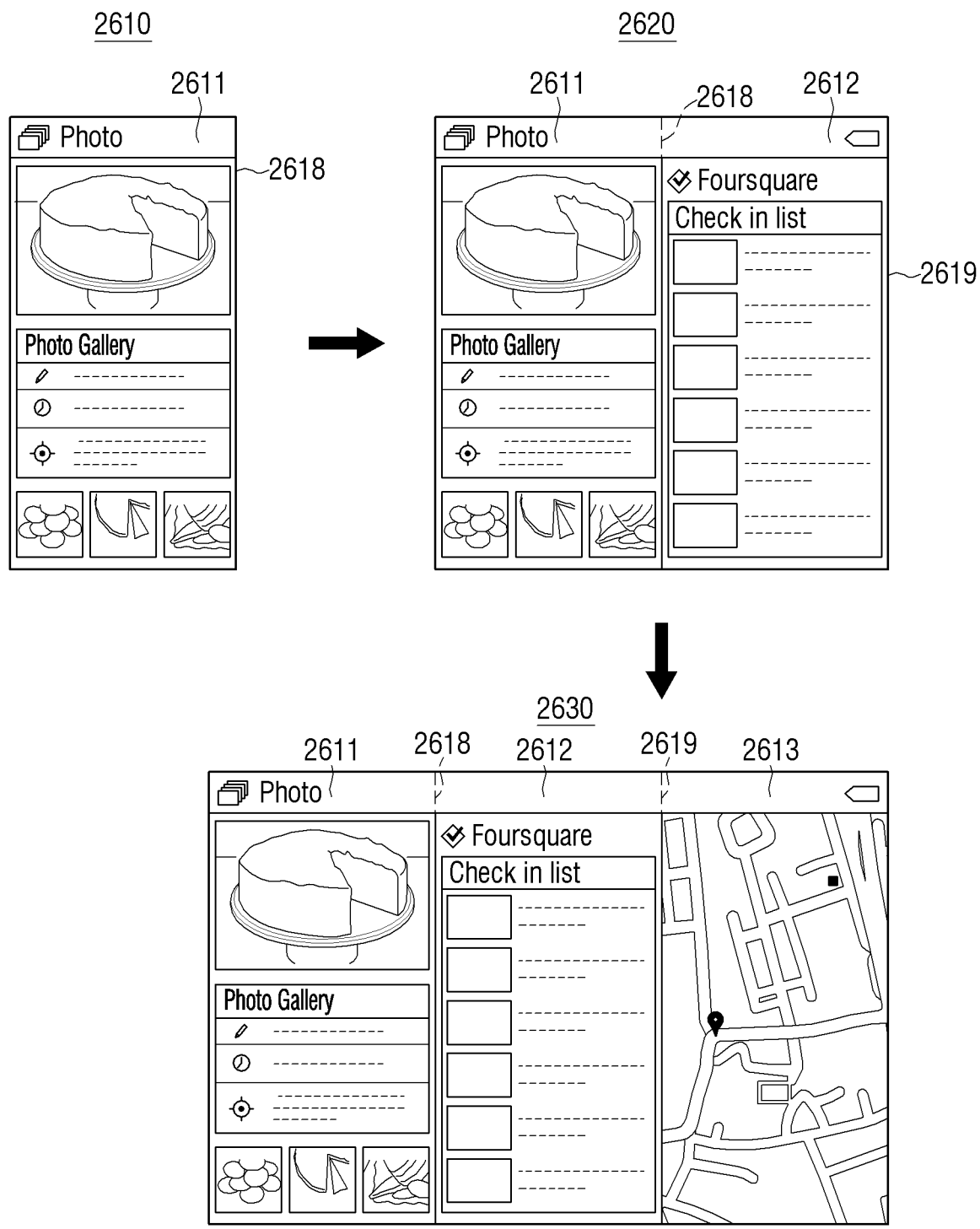

FIG. 26 depicts views illustrating an exemplary embodiment of performing various functions of the user terminal device 200 as the display 230 is unfolded with reference to a plurality of folding lines, according to another exemplary embodiment.

As illustrated in 2610 of FIG. 26, the controller 290 may control the display 230 so that the gallery application or the camera application is executed and an image content including a still image or a moving image of a product is displayed in a first display area 2611. In this case, the bending detector 283 may detect a first bending interaction of unfolding the display 230 with reference to a first folding line 2618.

In response to the first bending interaction being detected through the bending detector 283, as illustrated in 2620 of FIG. 26, the controller 290 may control the display 230 so that an image content and at least one piece of market information that may be used to purchase a product related to the image content are displayed in the first display area 2611 and a second display area 2612. A market may be an online market or an offline market. Online market information may include an icon of an application by which a user is able to purchase a product, and offline market information may include a picture or a name of a shop where a user is able to purchase a product. According to another exemplary embodiment, the controller 290 may control the display 230 so that an image content and a check-in list (using social networking applications) are displayed in the first display area 2611 and a second display area 2612. Furthermore, the bending detector 283 may detect a second bending interaction of unfolding the display 230 with reference to a second folding line 2619.

In response to the second bending interaction being detected through the bending detector 283, as illustrated in 2630 of FIG. 26, the controller 290 may control the display 230 so that an image content, information on at least one market, and detailed information on the at least one market (such as location on the map) are displayed in the first display area, the second display area 2612, and a third display area 2613. For example, in case of an offline market, the detailed information on the at least one market may be a location of the market on a map, an address of the market, or a web page operated by the market. In case of an online market, the detailed information on the at least one market may be an execution screen of a market application or a screen where a user is able to pay for a product.

Figure 27:
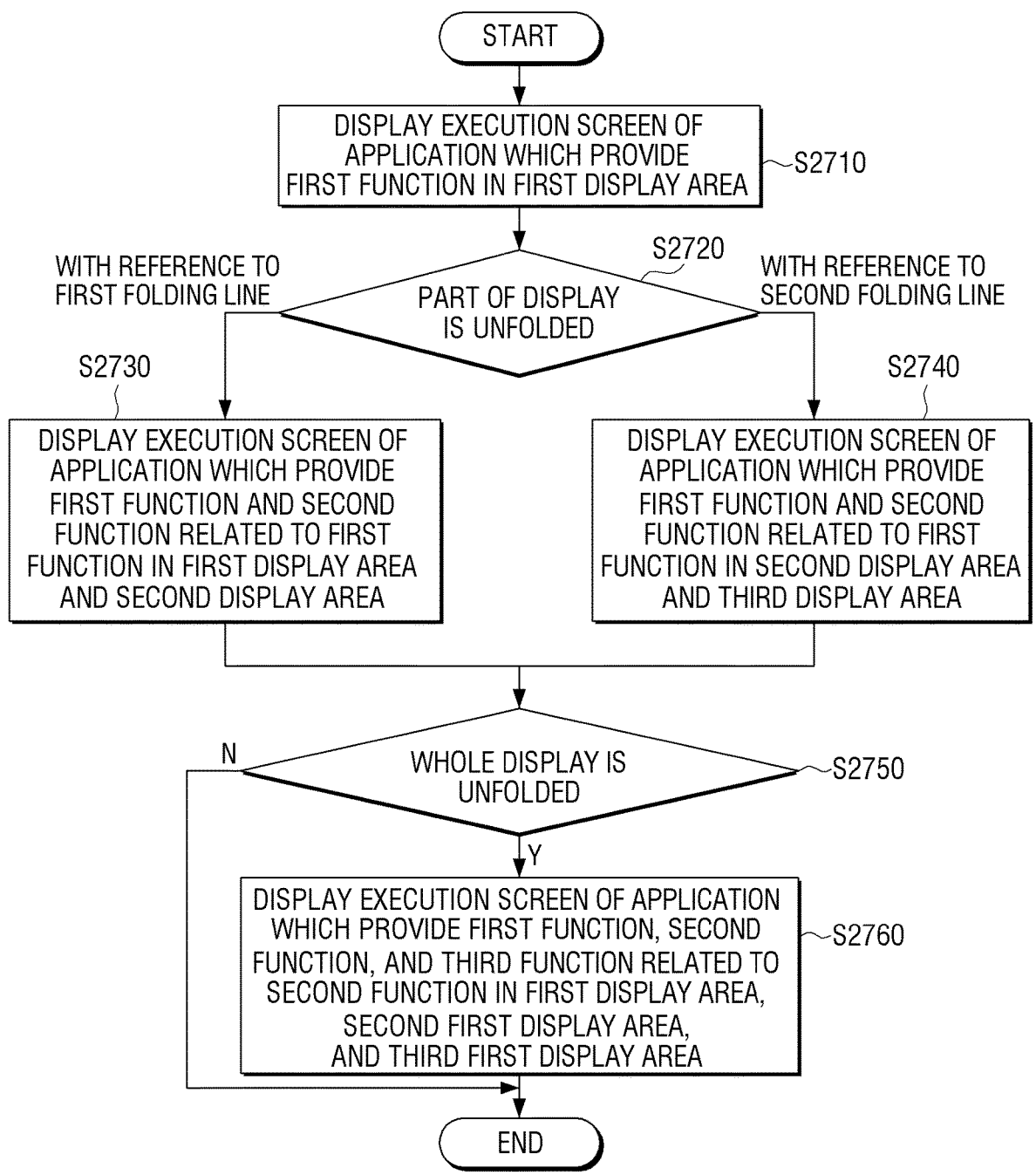
FIGS. 27 and 28 are flowcharts describing a displaying method of a user terminal device according to an exemplary embodiment.

FIG. 27 is a flowchart describing a displaying method of the user terminal device 200 according to an exemplary embodiment.

First, the user terminal device 200 including the display 230 which is divided into a first display area, a second display area, and a third display area with reference to a first folding line and a second folding line, according to an exemplary embodiment, may display an execution screen of an application which provides a first function in the first display area (S2710).

Then, the user terminal device 200 may determine whether a part of the display 230 is unfolded (S2720).

In response to the display 230 being unfolded with reference to the first folding line, the user terminal device 200 may display an execution screen of an application which provides the first function and a second function related to the first function in the first display area and the second display area (S2730). Alternatively, in response to the display 230 being unfolded with reference to the second folding line, the user terminal device 200 may display an execution screen of an application which provides the first function and the second function related to the first function in the second display area and the third display area (S2740).

Subsequently, the user terminal device 200 may determine whether the whole display 230 is unfolded (S2750). Specifically, the user terminal device 200 may determine whether the display 230 is unfolded with reference to both of the first folding line and the second folding line, according to an exemplary embodiment. In this case, the user terminal device 200 may display an execution screen of an application which provides the first function, the second function, and a third function related to the second function in the first display area, the second display area, and the third display area (S2760), according to an exemplary embodiment.

Figure 28:
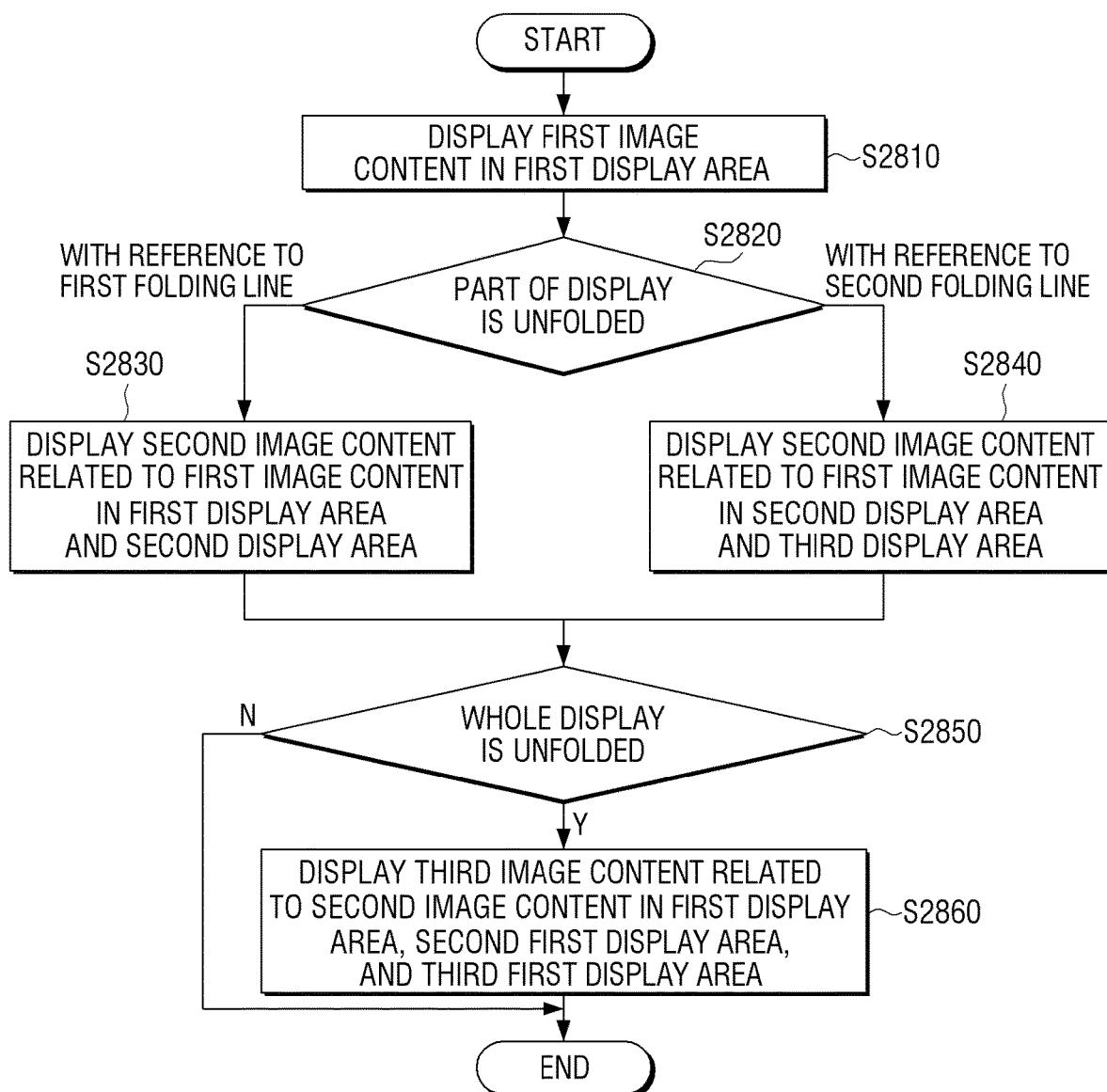

FIG. 28 is a flowchart describing a displaying method of the user terminal device 200 according to another exemplary embodiment.

First, the user terminal device 200 including the display 230 which is divided into a first display area, a second display area, and a third display area with reference to a first folding line and a second folding line, according to an exemplary embodiment, may display a first image content in the first display area (S2810).

Then, the user terminal device 200 may determine whether a part of the display 230 is unfolded (S2820).

In response to the display 230 being unfolded with reference to the first folding line, the user terminal device 200 may display a second image content related to the first image content in the first display area and the second display area (S2830). Alternatively, in response to the display 230 being unfolded with reference to the second folding line, the user terminal device 200 may display the second image content related to the first image content in the second display area and the third display area (S2840).

Subsequently, the user terminal device 200 may determine whether the whole display 230 is unfolded (S2850). Specifically, the user terminal device 200 may determine whether the display 230 is unfolded with reference to both of the first folding line and the second folding line, according to an exemplary embodiment. In this case, the user terminal device 200 may display a third image content related to the second image content in the first display area, the second display area, and the third display area (S2860).

As described above in connection with FIGS. 5 to 28, the user terminal device 200 may perform various operations according to a bending state of the display 230.

According to the above-described displaying methods, it is possible to provide a user with various user experiences through the user terminal device 200 including the display 230 which may be bent along a plurality of hinges 235.

A displaying method of a user terminal device according to various exemplary embodiments may be realized as a program and provided in a user terminal device. Specifically, a non-transitory computer readable medium which stores a program including a controlling method of a user terminal device may be provided.

Specifically, the non-transitory readable medium may refer to a medium which may store data semi-permanently rather than storing data for a short time such as a register, a cache, and a memory and may be readable by an apparatus. The non-transitory readable medium may be compact disc (CD), a digital versatile disk (DVD), a hard disk, a Blu-ray disk, a universal serial bus (USB), a memory card, and a read-only memory (ROM), etc.

The foregoing embodiments and advantages are merely exemplary and are not to be construed as limiting. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. An electronic apparatus comprising:
a first hinge and a second hinge;
a display configured to be folded with reference to a first folding line corresponding to the first hinge and a second folding line corresponding to the second hinge;
a processor configured to:
based on detecting a first folding interaction of folding the display with reference to the first folding line, control the display to display first information on a first exposure area in the display, which is exposed to outside by the first folding interaction, and
based on detecting a second folding interaction of folding the display with reference to the second folding line, control the display to display second information on a second exposure area in the display, which is exposed to the outside by the second folding interaction.

2. The electronic apparatus as claimed in claim 1, wherein the processor is configured to:
based on detecting the first folding interaction, perform a first function corresponding to the first folding interaction, and control the display to display the first information related to the first function on the first exposure area; and
based on detecting the second folding interaction, perform a second function corresponding to the second folding interaction, and control the display to display the second information related to the second function on the second exposure area.

3. The electronic apparatus as claimed in claim 1, wherein the first information and the second information is provided by a same application.

4. A display method of a user terminal device including a display that is folded with reference to a first folding line and a second folding line, the method comprising:
based on detecting a first folding interaction of folding the display with reference to the first folding line, displaying first information on a first exposure area in the display, which is exposed to outside by the first folding interaction, and
based on detecting a second folding interaction of folding the display with reference to the second folding line, displaying second information on a second exposure area in the display, which is exposed to the outside by the second folding interaction.

5. The display method as claimed in claim 4, comprising:
based on detecting the first folding interaction, performing a first function corresponding to the first folding interaction, and controlling the display to display the first information related to the first function on the first exposure area; and
based on detecting the second folding interaction, performing a second function corresponding to the second folding interaction, and controlling the display to display the second information related to the second function on the second exposure area.

6. The display method as claimed in claim 4, wherein the first information and the second information is provided by a same application.

* * * * *